US012504136B2

(12) United States Patent
Reilly et al.

(10) Patent No.: US 12,504,136 B2
(45) Date of Patent: Dec. 23, 2025

(54) RETENTION, ADJUSTABILITY AND MAINTENANCE FOR A RECESSED COMPONENT SUCH AS A RECESSED LUMINAIRE

(71) Applicant: Lucifer Lighting Company, San Antonio, TX (US)

(72) Inventors: Jack Reilly, San Antonio, TX (US); Brian Beck, Spring Branch, TX (US); Anuj Maloo, San Antonio, TX (US); Matt Tenorio, Live Oak, TX (US); Evan Dillon, Universal City, TX (US); James Lorenz, San Antonio, TX (US)

(73) Assignee: Lucifer Lighting Company, San Antonio, TX (US)

( * ) Notice: Subject to any disclaimer, the term of this patent is extended or adjusted under 35 U.S.C. 154(b) by 0 days.

(21) Appl. No.: 18/944,380

(22) Filed: Nov. 12, 2024

(65) Prior Publication Data

US 2025/0067408 A1 Feb. 27, 2025

Related U.S. Application Data

(63) Continuation of application No. 18/141,092, filed on Apr. 28, 2023, now Pat. No. 12,173,864, which is a
(Continued)

(51) Int. Cl.
*F21S 8/02* (2006.01)
*F21V 5/00* (2018.01)
(Continued)

(52) U.S. Cl.
CPC .............. *F21S 8/026* (2013.01); *F21V 5/008* (2013.01); *F21V 21/04* (2013.01); *F21V 29/773* (2015.01)

(58) Field of Classification Search
CPC ........ F21S 8/026; F21V 29/773; F21V 5/008; F21V 21/04
See application file for complete search history.

(56) References Cited

U.S. PATENT DOCUMENTS 4,623,956 A 11/1986 Conti
5,044,985 A 9/1991 Sheen
(Continued)

FOREIGN PATENT DOCUMENTS

AU 2009249557 A1 11/2009
AU 2011100986 A4 9/2011
(Continued)

OTHER PUBLICATIONS

International Search Report dated Dec. 5, 2022 in corresponding PCT Application No. PCT/US2022/033268.

*Primary Examiner* — Christopher E Dunay
(74) *Attorney, Agent, or Firm* — Harness, Dickey & Pierce, P.L.C.

(57) ABSTRACT

A light assembly includes a light source, a first lens and a first lens holder coupled around the light source holding the first lens in a fixed position relative to the light source. A second lens and a second lens holder are rotatably coupled to the first lens holder holding the second lens optically adjacent to the first lens. The second lens holder and the second lens are rotatable relative to the first lens and the first lens holder.

18 Claims, 31 Drawing Sheets

Related U.S. Application Data continuation of application No. 17/838,933, filed on Jun. 13, 2022, now Pat. No. 11,754,237.

(60) Provisional application No. 63/318,005, filed on Mar. 9, 2022, provisional application No. 63/209,981, filed on Jun. 12, 2021.

(51) Int. Cl.
*F21V 21/04* (2006.01)
*F21V 29/77* (2015.01)

(56) References Cited

U.S. PATENT DOCUMENTS

| | | | | |
|---|---|---|---|---|
| 5,902,035 | A | 5/1999 | Mui | |
| 6,016,596 | A | 1/2000 | Rodgers | |
| 6,030,102 | A | 2/2000 | Gromotka | |
| 7,614,769 | B2 | 11/2009 | Sell | |
| 8,132,943 | B2 | 3/2012 | Wang | |
| 8,215,805 | B2 | 7/2012 | Cogliano et al. | |
| 8,911,102 | B2 | 12/2014 | Holman et al. | |
| 9,239,149 | B2 | 1/2016 | Vice et al. | |
| 9,470,908 | B1 * | 10/2016 | Frankel | G02C 5/124 |
| 10,082,259 | B1 | 9/2018 | Pahl | |
| 10,247,390 | B1 | 4/2019 | Kopitzke, IV | |
| 10,247,394 | B2 | 4/2019 | Bardot et al. | |
| 10,544,924 | B2 | 1/2020 | Wronski et al. | |
| 10,641,446 | B2 | 5/2020 | Nguyen et al. | |
| 11,105,496 | B1 | 8/2021 | Huang et al. | |
| 2004/0080944 | A1 | 4/2004 | Ferguson et al. | |
| 2005/0047128 | A1 | 3/2005 | Monroe et al. | |
| 2005/0141818 | A1 | 6/2005 | Bobrowski | |
| 2007/0047241 | A1 | 3/2007 | Fryzek et al. | |
| 2008/0296458 | A1 | 12/2008 | Gibson et al. | |
| 2009/0323364 | A1 | 12/2009 | Bornhorst et al. | |
| 2010/0149822 | A1 | 6/2010 | Cogliano et al. | |
| 2010/0265725 | A1 | 10/2010 | Wilcox | |
| 2011/0163676 | A1 | 7/2011 | Farzan et al. | |
| 2012/0081901 | A1 * | 4/2012 | Tsang | F21V 5/048 362/277 |
| 2013/0271982 | A1 | 10/2013 | Rodriguez et al. | |
| 2015/0043223 | A1 | 2/2015 | Chen | |
| 2015/0308662 | A1 | 10/2015 | Vice et al. | |
| 2016/0186967 | A1 | 6/2016 | Mathews et al. | |
| 2017/0184285 | A1 | 6/2017 | Visser et al. | |
| 2017/0219188 | A1 * | 8/2017 | Veloskey | F21V 23/06 |
| 2018/0100638 | A1 * | 4/2018 | Lee | F21S 8/032 |
| 2018/0172249 | A1 | 6/2018 | Ocsko | |
| 2019/0011115 | A1 | 1/2019 | Healey | |
| 2020/0116340 | A1 | 4/2020 | Nikooyan et al. | |
| 2020/0149718 | A1 | 5/2020 | Warner et al. | |
| 2020/0348001 | A1 | 11/2020 | Spicer et al. | |
| 2021/0156524 | A1 * | 5/2021 | Moon | F21K 9/69 |
| 2022/0003392 | A1 | 1/2022 | Rose et al. | |
| 2022/0307659 | A1 | 9/2022 | Cohen | |
| 2022/0349535 | A1 | 11/2022 | Sonneman et al. | |
| 2023/0288035 | A1 | 9/2023 | Reilly et al. | |
| 2025/0075895 | A1 * | 3/2025 | Ernst | F21S 8/02 |

FOREIGN PATENT DOCUMENTS

| | | | |
|---|---|---|---|
| CA | 2146066 | A1 | 11/1995 |
| CA | 2268221 | A1 | 10/2000 |
| CN | 201041313 | Y | 3/2008 |
| CN | 202814396 | U | 3/2013 |
| CN | 203586295 | U | 5/2014 |
| CN | 104154470 | A | 11/2014 |
| CN | 107654909 | A | 2/2018 |
| CN | 207599500 | U | 7/2018 |
| CN | 207635166 | U | 7/2018 |
| DE | 1497267 | A1 | 5/1969 |
| EP | 0894663 | A2 | 2/1999 |
| EP | 2811222 | A1 | 12/2014 |
| EP | 3288280 | A1 | 2/2018 |
| ES | 1036203 | U | 7/1997 |
| ES | 1054940 | U | 9/2003 |
| ES | 1060966 | U | 12/2005 |
| GB | 2497925 | A | 7/2013 |
| IE | 20150287 | A1 | 11/2016 |
| IL | IE20150287 | | 11/2016 |
| JP | H02251943 | A | 10/1990 |
| JP | H03268676 | A | 11/1991 |
| JP | H0616368 | A | 1/1994 |
| JP | H08293209 | A | 11/1996 |
| JP | H09312101 | A | 12/1997 |
| JP | H10190966 | A | 7/1998 |
| JP | 3045629 | B2 | 5/2000 |
| JP | 2001067925 | A | 3/2001 |
| JP | 2010129227 | A | 6/2010 |
| JP | 2011096417 | A | 5/2011 |
| JP | 4816502 | B2 | 11/2011 |
| JP | 7005395 | B2 | 1/2022 |
| KR | 101976547 | B1 | 5/2019 |
| WO | WO-2011100156 | A1 | 8/2011 |

* cited by examiner

RETENTION, ADJUSTABILITY AND MAINTENANCE FOR A RECESSED COMPONENT SUCH AS A RECESSED LUMINAIRE

CROSS-REFERENCE TO RELATED APPLICATIONS

This application is a continuation of U.S. patent application Ser. No. 18/141,092, filed on Apr. 28, 2023, which is a continuation of U.S. patent application Ser. No. 17/838,933 filed on Jun. 13, 2022, which claims the benefit of U.S. Provisional Application No. 63/209,981, filed on Jun. 12, 2021, and 63/318,005 filed Mar. 9, 2022. The entire disclosures of the above applications are incorporated herein by reference.

TECHNICAL FIELD

The present disclosure relates generally to a luminaire, and more specifically, to a method and system for adjusting and retaining a recessed luminaire.

BACKGROUND

The statements in this section merely provide background information related to the present disclosure and does not constitute prior art.

When installing recessed luminaires, maintaining its position easily and reliably is important. Luminaires use various types of torsion springs, screw clamping mechanisms, ball plungers, knife-edge sheet metal pieces, slide out tabs and torsion springs in slots that are used to hold the fixture tight against the surface into which it is mounted. Many of the mechanisms for securing the luminaire against the mounting plane may not over passage of time hold the luminaire flush against the mounting surface and sag in part, which is unsightly and objectionable to the market. Additionally, such mechanisms may interfere with component operation near the mounting position. In the instance of the present disclosure, a small hole is drilled in the mounting surface to accommodate the luminaire. It is desirable to make the hole as small as possible so that the flange of the trim piece around the luminaire is small and covers the hole. Many designers find a small design aesthetically pleasing so as not to call unnecessary attention to luminaires set against the mounting plane. The extra space around the hole may be referred to as a goof allowance. It is desirable to have the smallest amount of goof allowance possible to minimize the diameter of the luminaire. By providing a small retention mechanism, the goof allowance may be minimized. However, existing luminaire designs and technology usages may require larger holes and trim covers to be made which is unnecessary and unsightly to designers.

Another issue with the installation of luminaires is all mounting areas are not uniform in thickness. Many retention mechanisms do not allow or accommodate various ceiling or wall thicknesses. Additionally, many luminaires utilizing an LED lamp require power supplies driving the lamp to be installed remotely elsewhere in the building interior because the opening through which the luminaire assembly is received cannot be accessed following first install for replacement of the power supply (the driver of the LED) if it should fail and require replacement. This adds to installation cost and is not desirable to the designer specifying lighting for the building interior.

The redirection of light from a luminaire is also important in some applications. That is, instead of light distribution being sculpted to highlight features of interior furnishings or sculpture for example, it can be adjusted with concealed optics to zoom in or out of focus. Some recessed luminaires, for example, use gear drive mechanisms, multiple-bar kinematic chain mechanisms and jackscrews to make adjustments. Many of these mechanisms only allow adjustment in discrete increments.

Further, many adjustment mechanisms are high in cost because the components require high tolerances and thus are more expensive to manufacture.

Luminaires also emit light with a certain amount of beam spread from the optical axis. In many luminaires, the amount of light spread is fixed by the optics of the lens through which the light is directed. The adjustability of the light distribution from a luminaire is important in many designs. Allowing an end user to adjust the light distribution in a cost effective design is important.

In wall-wash applications, the introduction of hardware within the recessed luminaire can be configured to blanket a wall plane uniformly with light, for example to light artwork or wall murals. It may be desirable to wash the wall in light from the ceiling plane down to the wall evenly with minimal scalloping or shadowing effects. Commonly, a kick-reflector is used to direct the light extensively from the surface or the ceiling (or plane to which it is mounted) down the adjacent wall. However, when the kick reflector extends a significant distance from the plane on which it is mounted, the result is less aesthetically pleasing because it draws unwanted attention to the mounting plane.

Adjustability of the beam width and direction can also be important. Previous attempts for all of these features have proven either unreliable or not cost effective.

Another issue associated with luminaires is serviceability or component replaceability, applicable to LED and power supplies driving the LED's which fail in operation on occasion Oftentimes, light assemblies are difficult to remove without causing damage to the surface into which they are mounted which can require unnecessary outside contractor cost to make sightly again. Further, allowing easy adjustment or accessibility for replacement of components is typically not found in prior luminaires of the scale of the present disclosure.

SUMMARY

The present disclosure provides a recessed luminaire that is one or more of easily and reliably retainable within a recess with spring assembly retainer, tiltable relative to the surface into which the luminaire is recessed, and has an adjustable beam spread that is angularly adjustable.

In one aspect of the disclosure, an assembly for an opening through a member is set forth. The assembly also includes a body; and a first spring retention assembly coupled to the body, said first spring retention assembly may include a first coil spring at least partially disposed within a first spring housing, said first coil spring having a first end extending through the first spring housing and coupled to the body, said first coil spring extendable from and retractable into the first spring housing.

Implementations may include one or more of the following features. The assembly where the body may include a flange, where said flange is adjacent an outer surface of the member and the first spring housing is disposed adjacent to an inner surface of the member. The body may include a trim piece. The assembly may include an inner recess disposed on an inner surface of the body. The first end may include an opening and where the inner recess may include a retainer received within the opening of the first end. The body may include an outer recess receiving the first coil spring, said inner recess and the outer recess having a slot therebetween receiving the first coil spring therein. The first spring housing may include a first position adjacent a longitudinal end of the body during insertion into the opening. The longitudinal end may include an heat sink subassembly. The first spring housing is disposed adjacent a trim piece after insertion into the opening. The first spring housing may include a first portion and a second portion that together form an outer annular wall and a first end wall and a second end wall, said outer annular wall may include a slot, said first end extending from the slot. The first portion may include the first end wall and a receiver extending from the first end wall and where the second portion may include the second end wall and a retainer extending from the second end wall. The first portion where the receiver may include an inner wall receiving the retainer. The inner wall may include a pair of slots and the retainer may include a pair of tabs engaging the pair of slots. The coil spring is disposed around the inner wall. The first end wall may include a first O-ring channel and a first O-ring disposed therein, and the second end wall may include a second O-ring channel having a second O-ring disposed therein. The outer annular wall may include a plurality of outer annular wall portions forming a discontinuous wall having the slot therein. The first portion may include at least one of the plurality of annular wall portions and the second portion may include at least one of the annular wall portions. The slot is disposed between two annular wall portions of the plurality of wall portions disposed on either the first portion or the second portion. The first spring housing may include a high friction surface disposed thereon. The assembly the body may include a trim piece coupled to a tilt mechanism subassembly, said tilt mechanism subassembly coupled to a heat sink subassembly. The assembly may include a second spring retention assembly coupled to the body, said second spring retention assembly may include a second coil spring and a second spring housing, said second coil spring having a first end extending through the second spring housing and coupled to the body, said second coil spring may include a coil portion disposed within the spring housing, said spring extendable from and retractable into the spring housing. The body is coupled to a component may include a speaker, a sensor or a wall controller. A light assembly may include: the assembly may include a light source coupled to the body; a first lens optically coupled to the light source; a first lens holder coupled around the light source holding the first lens in a fixed position relative to the light source; a second lens optically coupled to the first lens; and a second lens holder rotatably coupled to the first lens holder and holding the second lens optically adjacent to the first lens, said second lens holder and the second lens rotatable relative to the first lens and the first lens holder. An assembly may include: the assembly; a lower body may include a flange; and said lower body may include a first lateral edge disposed within or flush with the flange and a second lateral edge disposed within or flush with the flange, said lower body may include a first surface extending below the flange and forming a retainer, a first wall extending from the first lateral edge defining a second retainer, said lower body may include a lens extending between the first retainer and the second retainer. The assembly may include: a tilt assembly may include a first arm coupled to a second arm, said second arm rotatably coupled to the first arm at a pin defining an axis of rotation defined by at least a first pin; and an adjustment mechanism rotatably coupled to the first arm adjacent to the pin and moving the second arm. The adjustment mechanism may include a threaded fastener rotatably coupled to the first arm. The threaded fastener is disposed at an angle relative to a longitudinal axis of a trim piece. The threaded fastener may include a ball end and where the second arm may include a slot, said ball end disposed within the slot One general aspect includes a method of installing an assembly within an opening through a member may include a first side and a second side. The method also includes extending a first coil spring from within a first spring housing while a first end of the first coil spring is coupled to a body of the assembly, extending a second coil spring from within a second spring housing while a first end of the second coil spring is coupled to the body of the assembly; inserting the first spring housing and the second spring housing into the opening; thereafter, inserting the body of the assembly into the opening; and generating a force, by the first coil spring and the second coil spring, on the body in a longitudinal direction.

Implementations may include one or more of the following features. The method may include, after inserting, retracting the body at least partially from the opening while the first coil spring housing and the second coil spring housing are disposed against the first side of the member. The method may include replacing a portion of the assembly while the body extends at least partially from the opening. Extending the first coil spring may include extending the first coil spring from within the first spring housing while the first end of the first coil spring is coupled to a trim piece of the assembly. Inserting the body may include inserting a heat sink subassembly followed by an optic subassembly into the opening. Inserting the body may include inserting a heat sink subassembly followed by an optic subassembly followed by a tilt mechanism subassembly. Generating the force may include retaining a flange of a trim piece on the first side of the member with the force while the first spring housing and the second spring housing are disposed adjacent the second side of the member. One general aspect includes an assembly also includes an upper body; a tilt assembly may include a first arm coupled to a second arm, said second arm rotatably coupled to the first arm at a pin defining an axis of rotation defined by at least a first pin; and an adjustment mechanism rotatably coupled to the first arm adjacent to the pin and moving the second arm.

Implementations may include one or more of the following features. An assembly where the adjustment mechanism may include a threaded fastener rotatably coupled to the first arm. The threaded fastener is disposed at an angle relative to a longitudinal axis of a trim piece. The threaded fastener may include a ball end and where the second arm may include a slot, said ball end disposed within the slot. The slot is curved. The slot is disposed between a first portion of the second arm and a second portion of the second arm. The second arm may include a first portion coupled to the upper body and a second portion coupled to the pin. The first portion is perpendicular to the second portion. The second portion may include an extension received within a recess in the first arm. The recess defines a rotational limit for the second arm. An assembly may include a spring coupled between the first arm and the second arm, said spring resisting rotation of the second arm relative to the first arm. The spring may include a torsion spring may include a first end coupled to the first arm and a second end coupled to the second arm. The second arm rotates relative to the first arm at the axis of rotation, where the torsion spring is coupled adjacent the axis of rotation. The lower body may include a trim piece. An assembly may include a baffle disposed within the trim piece. An assembly may include a heat sink subassembly and an optical subassembly coupled to the second arm. An assembly may include a heat sink subassembly coupled to the second arm and a spring coupled to the first arm and the heat sink subassembly resisting rotation of the heat sink subassembly relative to the first arm. The spring may include a constant force spring. The first arm is circular and is disposed inside a trim piece. The second arm is partially circular. The second arm may include a plurality of retainers extending in a longitudinal direction coupling the second arm to a base of a heat sink subassembly. Plurality of retainers is received within respective recessed in the base. The first arm is coupled to a lower body.

One general aspect includes a light assembly having a light source; a first lens; a first lens holder coupled round the light source holding the first lens in a fixed position relative to the light source; a second lens; and a second lens holder rotatably coupled to the first lens holder and holding the second lens optically adjacent to the first lens, said second lens holder and the second lens rotatable relative to the first lens and the first lens holder.

Implementations may include one or more of the following features. The light assembly where the first lens holder may include a plurality of recesses on an outer surface and where the second lens holder may include fingers having a tab, said tab adjacent to a surface of a base of a heat sink subassembly, said fingers disposed within respective recesses. The light assembly may include a mount coupled to a heat sink subassembly and a retainer extending longitudinally from the first lens holder, said mount may include a retainer slot receiving the retainer. The first lens holder may include an outer cylindrical wall having a slot therethrough and the second lens holder may include a finger may include a tab, said tab received within the slot, where the slot and tab define a maximum beam spread and a minimum beam spread of the first lens and second lens. The light assembly where in the outer cylindrical wall further may include a second slot, said second slot receiving a second tab disposed on a second finger extending longitudinally from the second lens holder. The first lens holder is cylindrical may include a first diameter and the second lens holder may include a second diameter greater than the first diameter. The first lens hold fits partially within the second lens holder. In the first lens holder may include a plurality of detents on an outer wall thereof, said detents engaging a detent finger extending longitudinally therefrom, said detent finger engaging one of the detents. The second lens may include an extension extending radially therefrom, said second lens holder may include a notch on an inner surface of the outer wall, said extension received within the notch. The second lens holder may include an accessory holder.

One general aspect includes a wall wash light assembly having a light source generating light, a lower body comprising a lower surface defining a plane and a lens coupled to said lower body extending from the plane defined by the lower body. Implementations may include the lower body comprising a flange, said flange defining the plane; the lower body comprising a first lateral edge disposed within or flush with the flange and a second lateral edge disposed within or flush with the flange, said lower body comprising a first surface extending below the flange and forming a retainer, a first wall extending from the first lateral edge defining a second retainer, said lens extending between the first retainer and the second retainer; a first lateral edge disposed within or flush with the flange and a second lateral edge disposed within or flush with the flange; the lens comprising one point or partial surface below the plane of the lower surface; the lens being planar; the lower body being rectilinear; the lower body comprising a baffle and a trim piece; a sealing ring coupled between the baffle and the trim piece; the baffle comprising a side wall having a triangular portion extending below the flange of the trim piece; an optic subassembly coupled at an angle relative to a base of an heat sink subassembly; the light source disposed off of a longitudinal axis; the light from the lens is directed to an adjacent wall; the light from the lens is directed to a mounting surface and an adjacent wall; the light from the lens being directed to a mounting surface, an adjacent wall and a corner therebetween; the lower body comprising a square cross-section.

In another aspect of the disclosure a wall wash light assembly coupled to a mounting surface has a light source generating light, a lower surface proud of the mounting surface and a lens with one point or a partial surface below a plane of the lower surface.

Further areas of applicability of the teachings of the present disclosure will become apparent from the detailed description, claims and the drawings provided hereinafter, wherein like reference numerals refer to like features throughout the several views of the drawings.

DRAWINGS

The drawings described herein are for illustrative purposes only of selected embodiments and not all possible implementations and are not intended to limit the scope of the present disclosure.

DETAILED DESCRIPTION

Example embodiments will now be described more fully with reference to the accompanying drawings.

Figure 1:
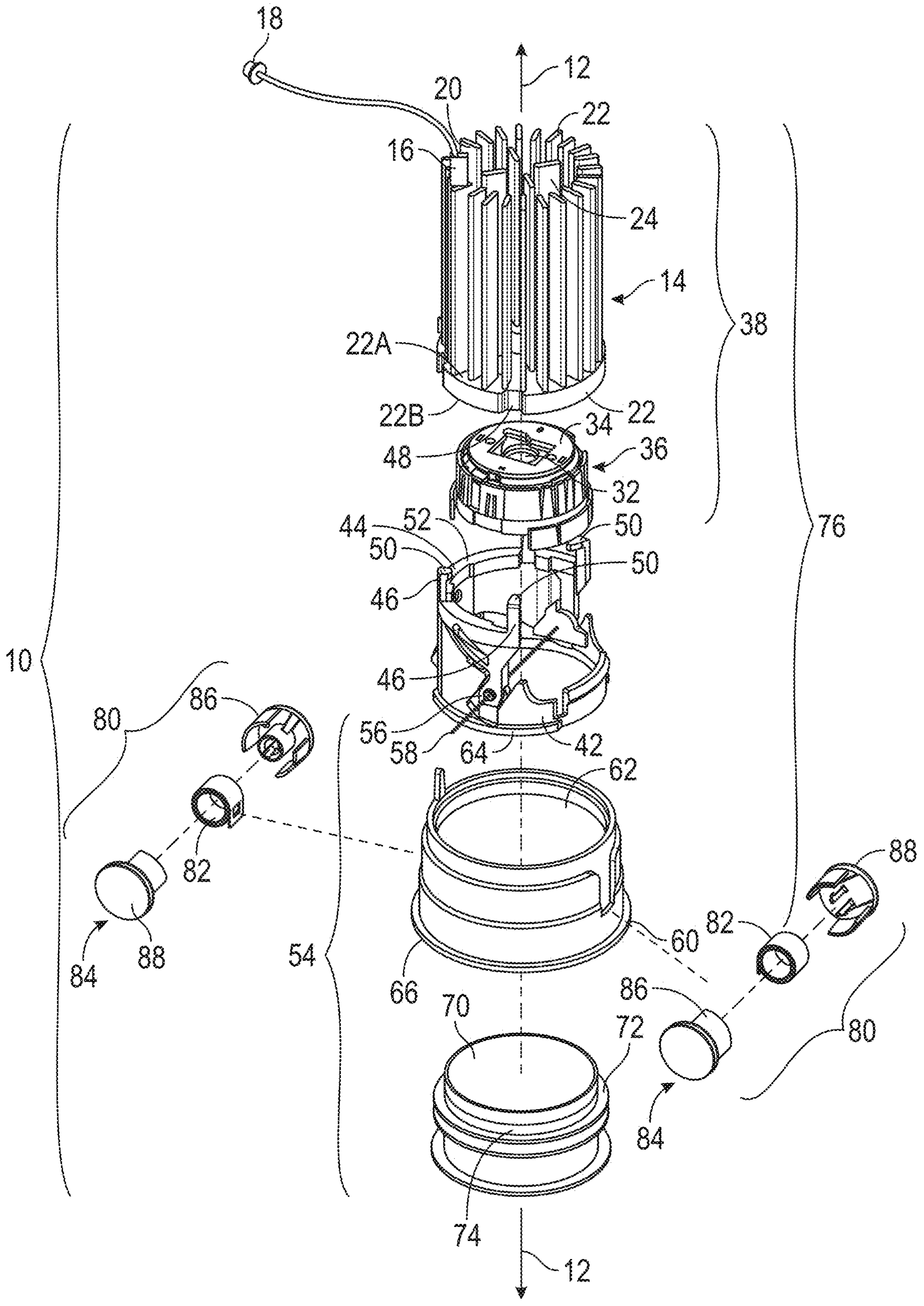
FIG. 1 is an exploded view of a first example of a luminaire according to the present disclosure.

Referring now to FIG. 1, a partially exploded view of a first example of a light assembly or luminaire 10 is illuminated. The luminaire 10 has a longitudinal axis 12 along which the subassemblies are illustrated. The luminaire 10 has an heat sink subassembly 14 that acts as a heat sink. Heat is generated by a light source 32 and/or a power source 16. The power source 16 may be coupled to an external power supply through a connector 18. The power source 16 may include an AC to DC converter and a driver circuit used for driving the LEDs of a light source 32.

The heat sink subassembly 14 in the present example comprises a plurality of heat sink fins 20. Although in this example, the heat sink subassembly 14 generally forms a cylinder, other shapes such as but not limited to rectangular solids may be used. The size and shape of the heat sink subassembly 14 are only limited by the size of the aperture into which they are installed. The heat sink fins 20 are disposed around a circumference of base 22, which is circular in cross-section. In this example, the heat sink fins 20 are rectangular and extend radially inward. Also in this example, the heat sink fins 20 form a cylindrical opening or volume in which a second group of heat sink fins 24 are disposed. In this example, the second group of heat sink fins 24 are disposed radially around the axis 12 and spaced apart radially from the first group of heat sink fins 20. In this example, twenty-three fins are disposed around the circumference. Four fins 24 are disposed within the center at 90 degree angles to each other. The number, shape and positions of the heat sink fins may vary depending on various design considerations and applications.

An optic subassembly 30 is coupled to the heat sink subassembly 14. The optic subassembly 30 has the light source 32 such a plurality of light emitting diodes by way of example. Other light sources including but not limited to micro-LEDs, quantum dots, and OLEDs may also be used. The optic subassembly 30 also has a mount 34 that is used to mount or secure the light source 32 directly to the base 22. In this example, the light source 32 is centered at the longitudinal axis 12. The mount 34 is in this example is circular in shape and will be described in further detail below. Other shapes for the mount 34 may be used. The mount 34 is illustrated coupled to a holder 36. The holder 36 is used to hold the optics of the optic subassembly 30. In some examples, the holder 36 holds one single lens. In other examples, the holder 36 may hold a plurality of lenses that may be adjusted to allow the light distribution angle to be changed. As will be described in more detail below, the mount 34 is mounted to the base 22 of the heat sink subassembly 14. The holder 36 is coupled to the mount 34.

A tilt mechanism subassembly 40 is disposed adjacent to the optic subassembly 30. In this example, the tilt mechanism subassembly 40 is coupled to the base 22 of the heat sink subassembly 14.

The optic subassembly 30 and the heat sink subassembly 14 form an upper body 38 that is pivotally mounted to a tilt mechanism subassembly 40. The upper body 38 may include the light source 32 and/or a holder 36, a lens or lenses, and/or the heat sink subassembly 14. The tilt mechanism subassembly 40 has a first arm 42 that remains stationary relative to a second arm 44. The second arm 44 may also be part of the upper body 38. A cross-section of the first arm 42 is circular in shape. The second arm 44 pivots relative to the first arm 42. Ultimately the first arm 42 is coupled to the components such as lower body 54 that are mounted within the opening. The lower body 54 may include the trim piece 60 and or the baffle sub-assembly 70 or merely the first arm 42. The second arm 44 has a plurality of tabs 46 that are received within recesses 48 disposed around the circumference of the base 22. Of course, screws, rivets, fasteners and adhesives maybe used to secure the second arm 44 to the base 22. The width of the recesses 48 are sized to receive the width of the tabs 46. The tabs 46 extend in a longitudinal direction and have a radial direction portion 50 that engages the upper surface 22A of the base 22 which is opposite the optic subassembly 30 and the second arm 44 adjacent to a lower surface 22B of the base 22. In this example, four tabs 46 are received in four recesses 48. As will be described in more detail below, when assembled, the lower surface 22B of the base 22 is disposed directly adjacent to the upper surface 52 of the second arm 44. The first arm 42 and the second arm 44 are joined together and rotate about a pin 56. In this example, two pins 56 are disposed on each side of the first arm 42 and share an axis of rotation 58. The pin 56 may be integrally formed with the first arm 42. The heat sink subassembly 14 and the optic subassembly 30 together with the second arm 44 rotate around the axis of rotation 58 that is perpendicular to the longitudinal axis 12.

A trim piece 60, which, in this example, is cylindrical in shape is coupled to the first arm 42. The trim piece 60 may positions the tilt mechanism subassembly 40 relative to an aperture of opening. That is, the trim piece 60 and the first arm 42 may be fixed in place during operation after installation. However, the trim piece 60 may also move. When the second arm 44 tilts, the trim piece 60 and the first arm 42 may be maintained in position.

The trim piece 60 has a generally uniform internal diameter except for an annular ring 62. Although an annular ring 62 is illustrated, the ring 62 may be discontinuous. The annular ring 62 extends inward toward the longitudinal axis to provide a stop for a flange 73 that extends radially outwardly from the first arm 42. When the upper housing is inserted into the bottom of the trim piece 60 the annular ring 62 prevents further longitudinal movement. The flange 64 may be disposed around or partially around the bottom edge of the first arm 42. In one constructed embodiment, two flanges 64 disposed on opposite sides of the first arm 42 that form about a quarter of the circumference of the first arm 42 respectively. In one constructed example, the trim piece 60 was formed of metal. Further, the annular ring may be also disposed on the first arm 42 and snap arm disposed at 64 for holding the arm 42 together with the trim piece.

The trim piece 60 has a flange 66 that extends therefrom. The flange 66 forms a planar surface and the upper surface of which rests against the surface to which it is mounted.

A baffle subassembly 70 is sized to be received within the trim piece 60 of the lower body 54. That is, the outer diameter of the baffle subassembly 70 is less than the inner diameter of the trim piece 60. The baffle subassembly 70 has an O-ring 72 disposed within a groove that is annular in shape. The O-ring 72 is compliant and therefore allows a snug fit within the trim piece 60. Although a separate trim piece 60 and baffle subassembly 70 are illustrated, the components may be combined into one piece of the lower body 54.

The trim piece 60 and the baffle subassembly 70 are illustrated as circular in cross-section. However, various other types of cross-sections, such as rectangular, square and other shapes, may be used. When using other shapes, the trim piece may still have a round cross-section at the top which changes to a square cross section toward the bottom of the luminaire 10.

The luminaire 10 has a first body 76 defined by the upper body 38 (the heat sink subassembly 14, the optic subassembly 30 and the holder 26), the tilt mechanism assembly 40 and the trim piece 60. The body 76 may also include the baffle subassembly 70.

A spring retention assembly 80 is used to secure the body 76 luminaire 10 within an opening of a member as described in more detail below. The spring retention assembly 80 may allow not only easy assembly but removal of the luminaire or other component, or replacement or adjustments of portions of the luminaire or components. The spring retention assembly 80 comprises a coil spring 82 disposed within a spring housing 84. In this example, the spring housing 84 comprises a first portion 86 and a second portion 88, details of which are provided below. Of course, a one-piece housing and more than a two piece housing may be used. In general, the coil spring 82 is coupled to the trim piece 60. Two spring retention assemblies 80 are used in the present example. However, one or more than two may also be employed. In general, the coil spring 80 is fixed to the trim piece 60. The spring housing 84, in this example, is formed by snapping together the first portion 86 and the second portion 88.

Figure 2A:
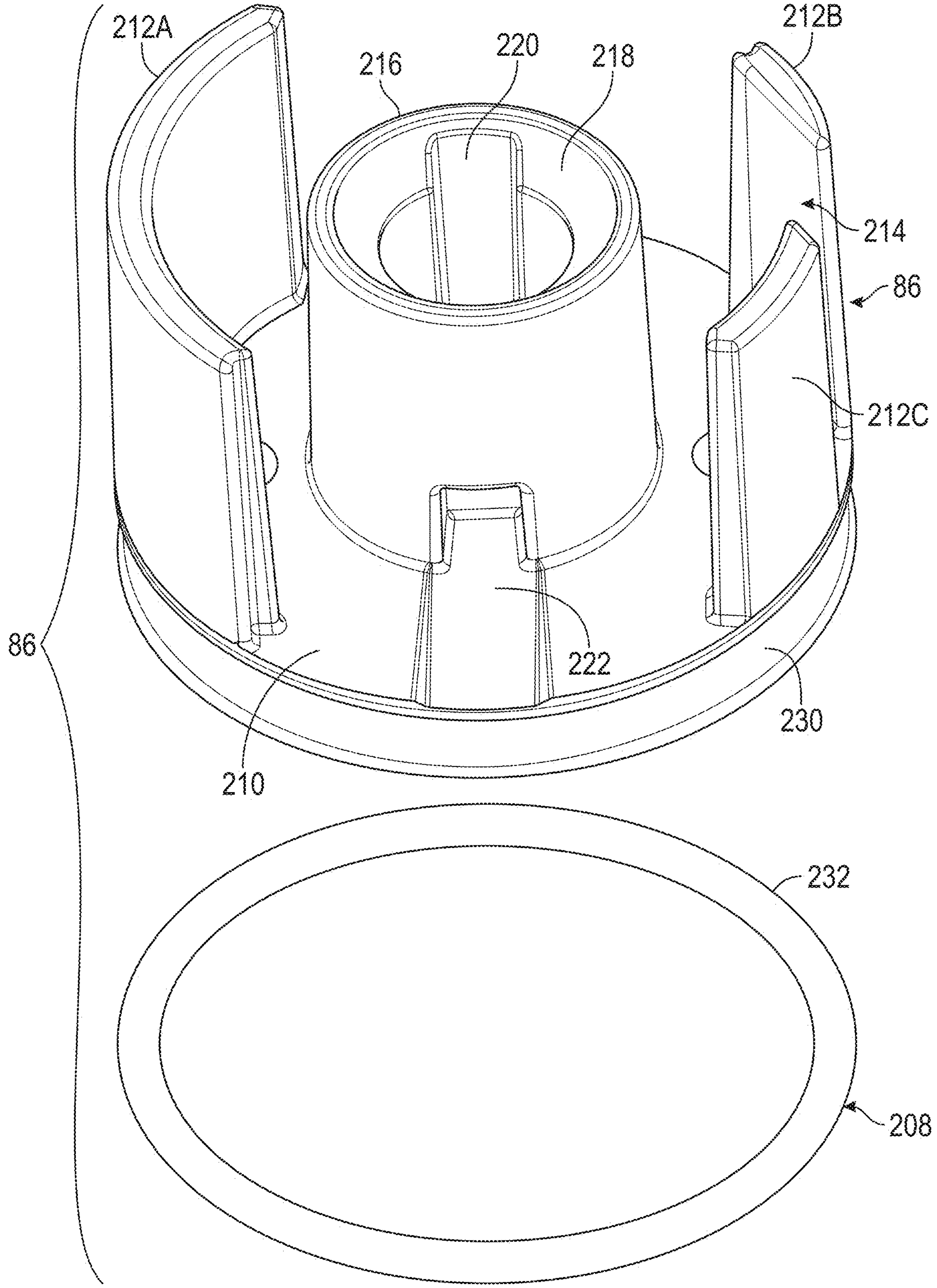
FIG. 2A is a perspective view of a first portion of a spring retention subassembly.

Referring now to FIG. 2A, the first portion 86 of the spring housing 84 is illustrated in further detail. By way of example, the first portion 86 comprises an end wall 210 that is circular in shape. The end wall 210 has annular outer wall portions 212A, 212B and 212C that ultimately form the outer annular wall 212 (with wall portions 242A and 242B in FIG. 2B). A slot 214 is disposed between the annular wall portions 212B and 212C so that the end of the coil spring 82 extends therefrom. The slot 214 between two adjacent outer wall portions on the same housing portion facilitates assembly of the spring housing 84.

The first portion 86 also has an inner wall. Should the first portion be cylindrical the first portion 86 may be an annular wall. The inner annular wall 216 has a tapered cross section 218 that tapers inward and toward the end wall 210. That is, the thickness of the inner annular wall 216 has a ramped edge of thickness. The ramped edge or thickness is discontinuous at the slots 220. Two slots 220 are illustrated and terminate at an opening 222 that is adjacent to the end wall 210. In this example, the first outer wall portion 212A, the second outer wall portion 212B and the third outer wall portion 212C, together with the slot 214, form about half of the circumference of the annular wall 212. The volume between the inner annular wall 216 and the outer annular wall 21 forms a cavity 224 to receive the spring coil 266 and the second end 264 thereof.

The end wall 210 has high friction surface 208 thereon. High friction means a higher friction than the material of the spring housing 84. The high friction surface 208 is disposed on one or more surfaces of the spring housing 84. The high friction surface 208 may be integrally formed in a manner such as over-molding or separate component such as a stick-on or O-ring 232. The high friction surface 208 could include teeth or other means for engaging a surface. In the present example, an annular O-ring channel 230 is disposed on an edge of the housing 84. The channel 230 is thus circumferential around the end of the end wall 210. The channel 230 receives the O-ring 232 that partially extends from the channel 230. The O-ring 232 may be formed of rubber or another type of material. Preferably, the material of the O-ring 232 is compliant and allows the spring housing 84 to better maintain its position or grip after assembly. The first portion 86 may be molded from a plastic material.

Figure 2B:
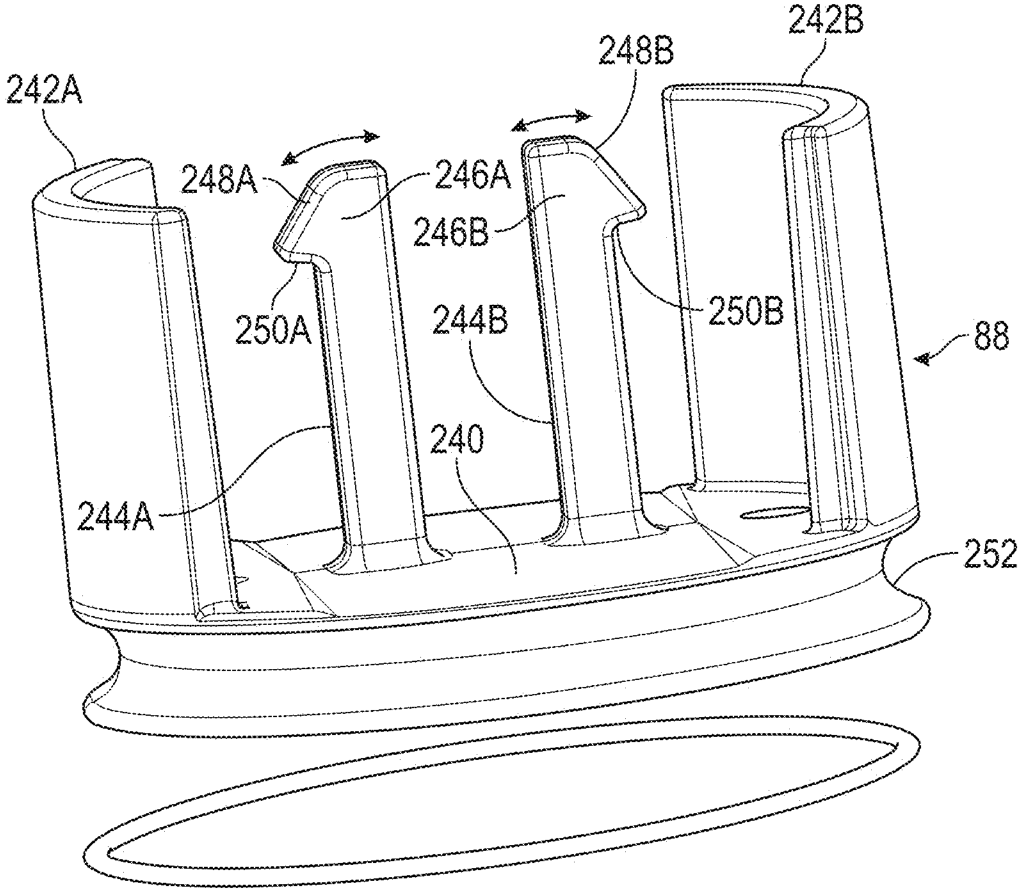
FIG. 2B is a perspective view of a second portion of the spring retention subassembly.

Referring now to FIG. 2B, the second portion 88 of the spring housing 84 is set forth. The second portion 88 has an end wall 240 and two outer annular wall portions 242A and 242B. In this example, the wall portions 242A, 242B are located on opposite sides of the second portion 88. In this example, the first outer annular wall portion 242A and the second outer annular wall portion 242B may take up about 50% (25% each) of the circumference end wall 240 and the overall annular wall 212.

The end wall 240 has a pair of retainers 244A and 244B extending in an axial direction and spaced apart. The retainers 244A and 244B may be flexible so that during assembly they move. The retainers 244A and 244B have a tab 246A, 246B at the end thereof. The tabs 246A and 246B are formed of a ramped or angular surface 248A, 248B and a catch surface 250A and 250B, respectively. Upon insertion into the inner annular wall 216, the ramped surfaces 248A, 248B cause the retainers 244A, 244B to flex inward toward each other. During assembly, the second portion 88 is rotated so that the tabs 246A, 246B are received within the openings 222 on either side of the inner annular wall 216. In the present example, a snap fit sound and feel will be obtained when the tabs 246A, 246B are aligned with the opening 222.

The second portion 88, and the end wall 240 thereof, has a channel 252 disposed therearound for receiving an O-ring 232 or another high friction surface in a similar manner to that described above in FIG. 2A.

Figure 2C:
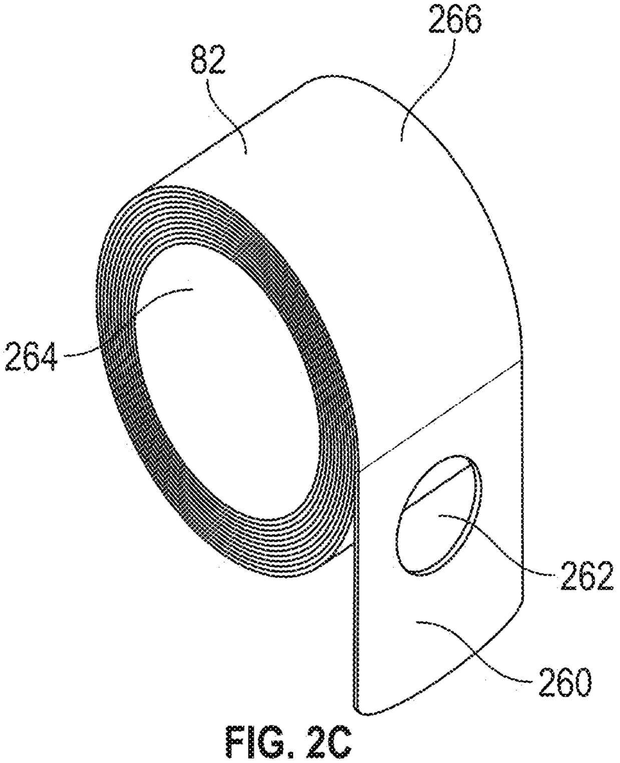
FIG. 2C is a perspective view of a coil spring of the spring retention subassembly.

Referring now to FIG. 2C, the coil spring 82 is illustrated in further detail. The coil spring 82 has a first end 260 that has an engagement means such as an opening 262 extending therethrough. Other types of engagement mean may include but are not limited to a dimple, a slot of other means formed therein or thereon. The coil spring 82 has a number of turns and resists being uncoiled. The coil spring 82 is extendable from and retractable into the spring housing 84. That is, the coil 82 has a tendency to remain in the coiled position. The coil spring 82 comprises a second end 264 that is disposed and is intended to stay disposed within the spring housing 84.

Figure 3A:
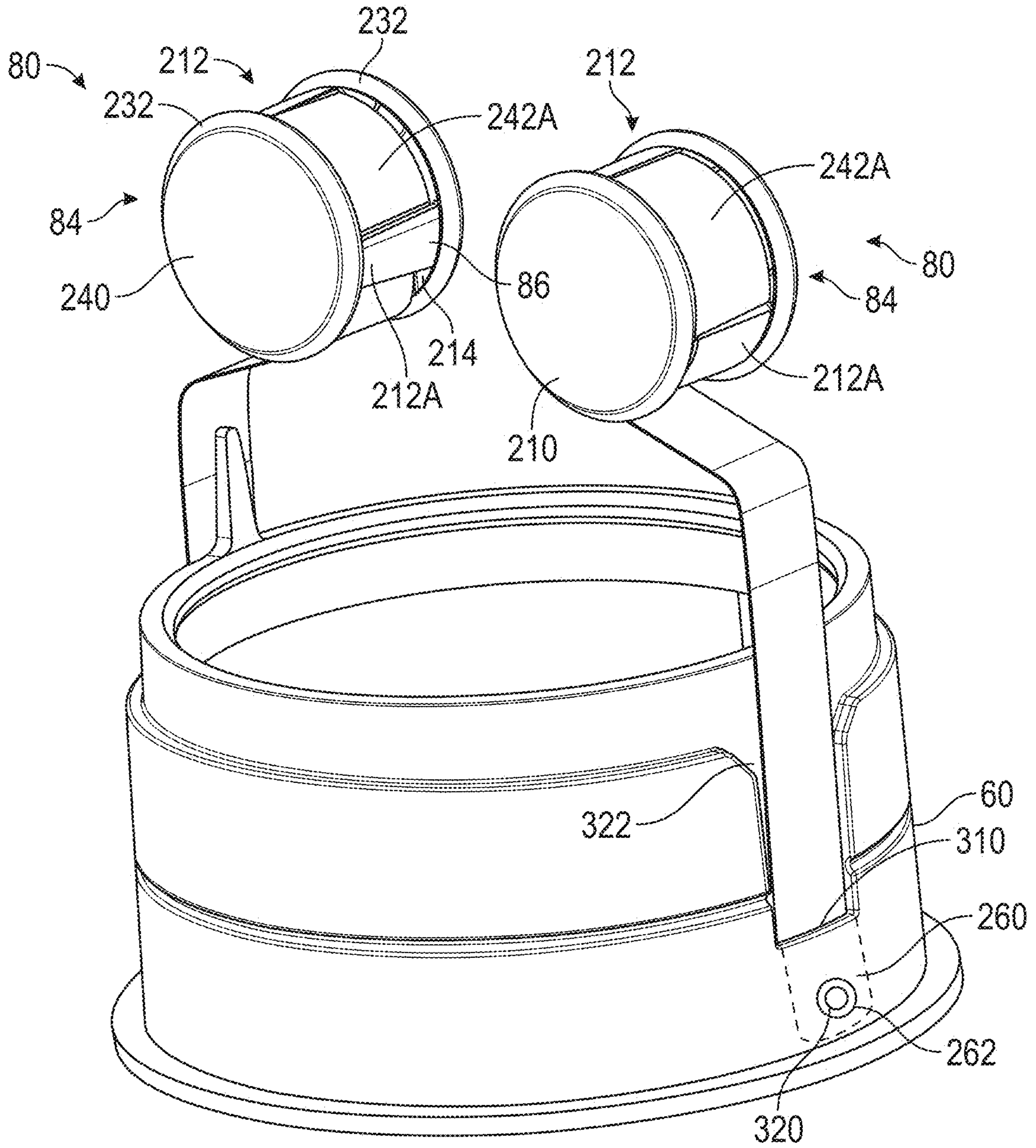
FIG. 3A is a perspective view of a partially extended spring retention assembly coupled to a trim piece.
Figure 3B:
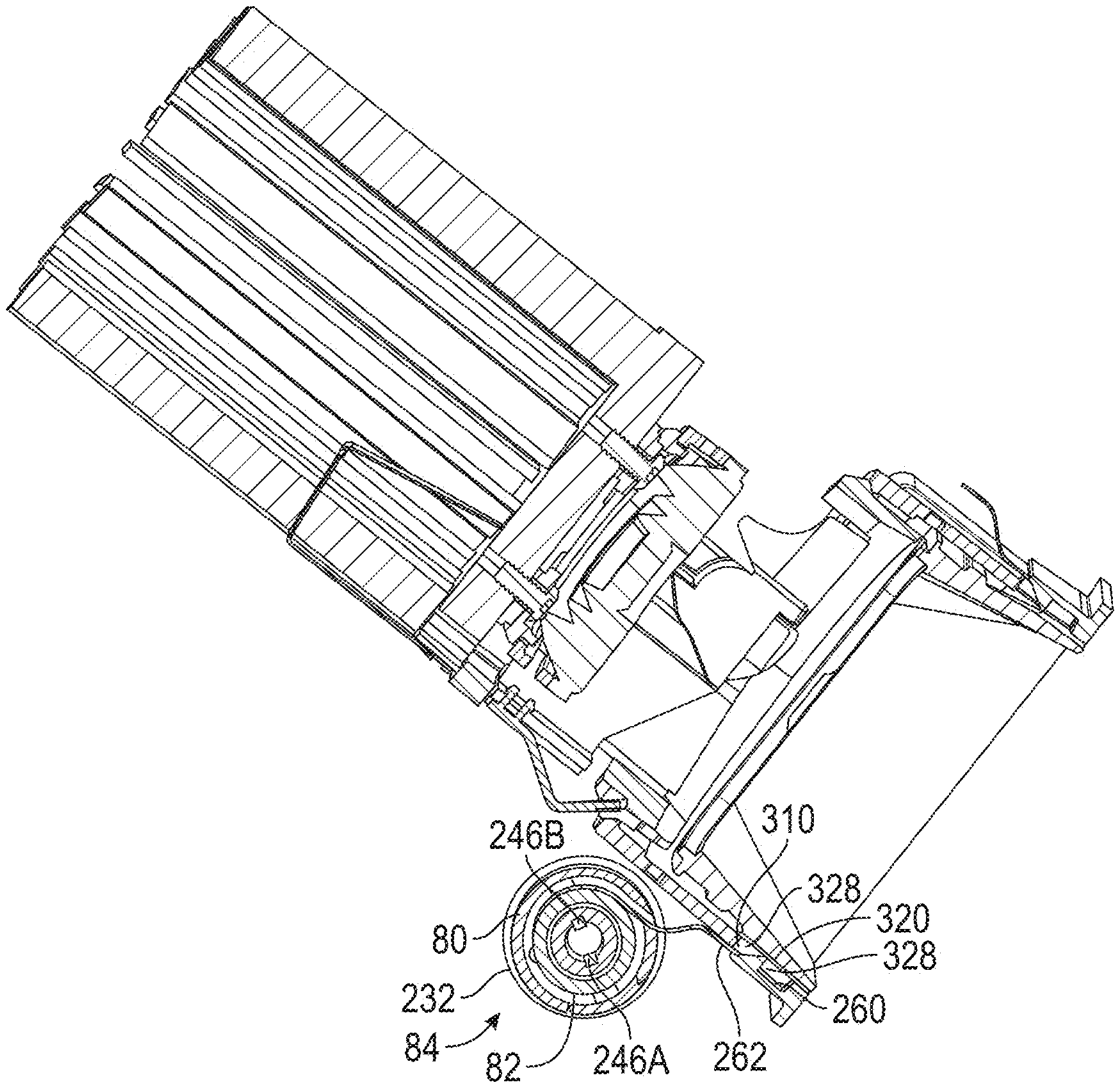
FIG. 3B is a partial cross sectional view of the spring retention assembly.
Figure 3C:
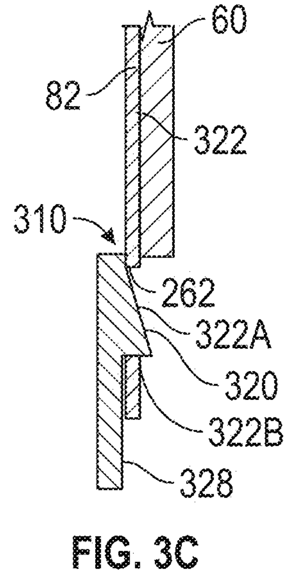
FIG. 3C is a cross-sectional view of the coil spring at the inner and outer recess.

Referring now to FIGS. 3A, 3B and 3C, details of the assembly of the spring retention assembly 80 relative to the trim piece 60 are set forth. The spring retention assemblies 80 are shown in a partially extended position.

The first end 260 and the opening 262 are positioned within a retainer means such as but not limited to a slot 310 on either side of the trim piece 60 in this example. The engagement means engages the retainer means to hold the spring 82 in place. The slot 310 may be wide enough to accommodate the width of the first end 260. A retainer 320 of the retainer means may extend inward from the inner surface of the trim piece 60 and engages the opening 262 of the first end 260. The engagement means may be a dimple on the spring and a holder or recess on the trim piece.

The trim piece 60 has various outer diameters. In this example, the outer diameter is reduced at an outer recess 322 so accommodate the first end 260 of the coil spring 82. The recess 322 may be integrally formed into the trim piece 60 during forming or molding. That is, the coil spring 82 is flat and fits flush or is itself recessed within the recess 322. This allows the trim piece 60 to easily be accommodated within a standard round opening. During insertion, the spring retention assemblies 80 are moved out of position as will be described in further detail below and as illustrated in FIG. 3A. In this example, the retainer 320 is formed by a ramped surface 322A and a catch surface 322B perpendicular to the wall of the inner recess 328 to catch the edge of the opening 262. The retainer 320 may be in the inner recess 328. The inner recess 328 may allow the retainer 320 to extend inward but not further than the generally constant inner diameter of the trim piece 60. The mismatch of the outer recess 322 and the inner recess 328 form the slot 310. That is the slot 310 is formed between the outer recess 322 and the inner recess 328.

In FIG. 3B, a cross section of the coil spring 82 having the first end 260 coupled to the retainer 320 at the opening 262 is set forth. The depth of the inner recess 328 is shown. FIG. 3C enlarges the cross-section at the recess.

Referring now to FIGS. 4A through 4E, different stages of installing the luminaire 10 are illustrated. During assembly, a hole or opening 410 is placed into a member 412 such as a ceiling or a wall for recessing the luminaire 10 therein. The member has a first side 412A and a second side 412B. Retention in the opening 410 takes place using the spring retention assemblies 80 as described in further detail below. That is, retention uses the spring retention assemblies 80.

Figure 4A:
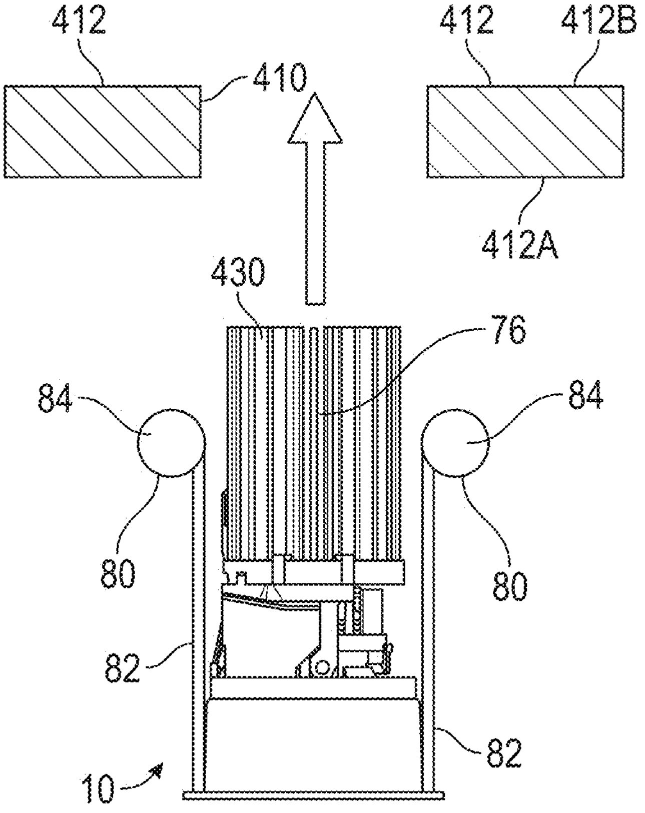
FIG. 4A is side view of the spring retention assemblies partially extended during insertion into a planar member.
Figure 4B:
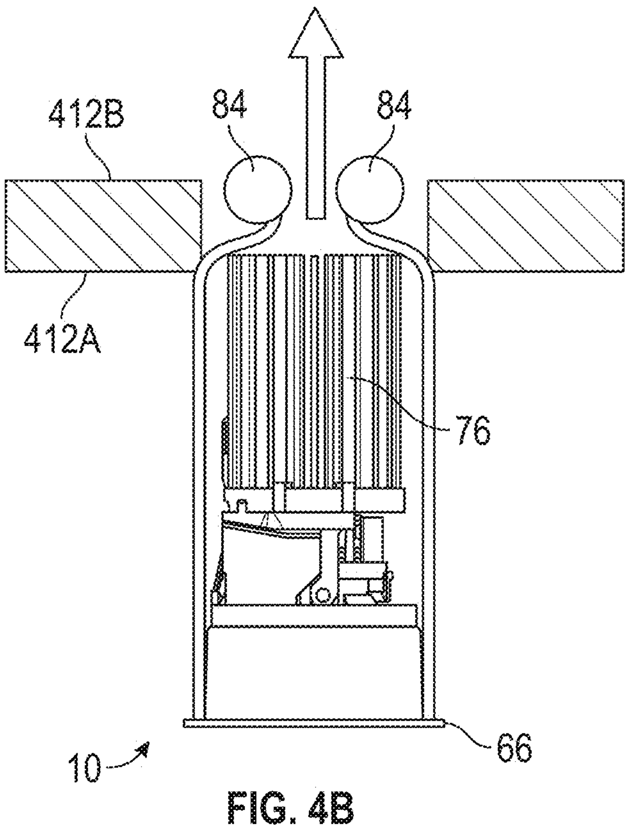
FIG. 4B is the luminaire partially extended within a member.
Figure 4C:
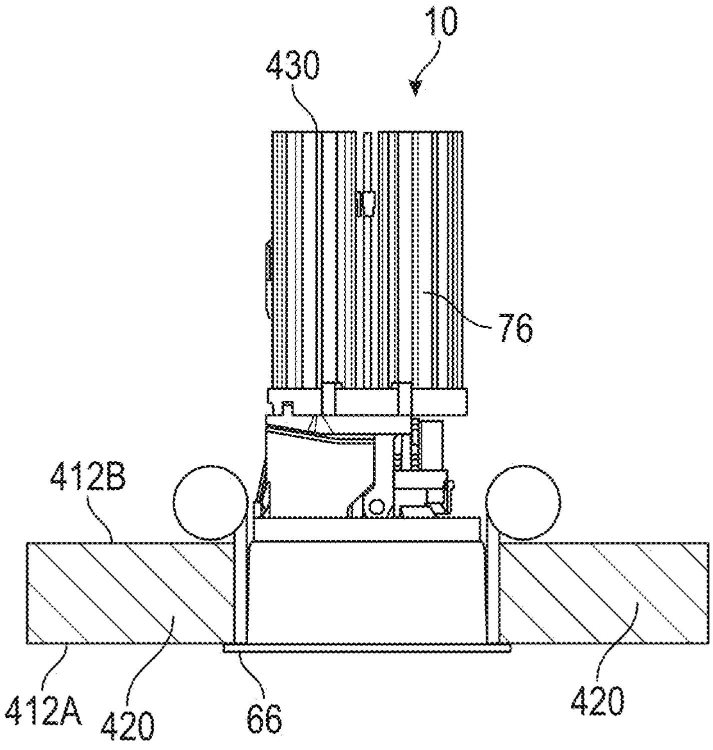
FIG. 4C is a side view of the luminaire inserted into a member.

More specifically, in FIG. 4A, the spring housings 84 are moved in an upward direction in this example. That is, the coil springs 82 of the spring housings 84 extend in a longitudinal direction while the end 260 of the coil spring 82 is maintained and assembled at the lower body 54 such as the trim piece 60. The coil spring 82 extends out of the housing 84 through the slot 214 mentioned above. While a complete luminaire is illustrated, different types of assemblies may use the spring retention assemblies 80. The spring housings 84 may be placed above the heat sink subassembly 14 of the body 76 during final insertion into the opening 410 (adjacent the longitudinal end 430 opposite the trim piece 60). A tool or other device may be used to maintain the coil spring in a position during assembly. The body 76 (or at least a portion thereof) of the luminaire 10 is thus pushed up into the opening 410. By way of example, the luminaire may have no heat sink subassembly 14 or an heat sink subassembly 14 that is installed within the opening and is not adjustable. This is illustrated in FIG. 4B. In this example, first the heat sink subassembly 14, followed by the optic subassembly 30, followed by the tilt mechanism sub-assembly, followed by the trim piece 60 up to the flange 66. The order of assembly may be different. The trim piece of the lower body 54 is retained in the opening at some point with one or more spring retention assemblies 80. In FIG. 4C, the luminaire 10 is held into position by the spring housings 84 and the force of the coil springs 82. The O-rings 232 may contact the second side 412B of the member 412. The coil spring 82 is biased to be retracted into the spring housing 84. This provides a downward (longitudinal direction) force illustrated by the arrow 420 imparted by the spring housing 84. The downward force pulls the trim piece 60 in an opposite direction so that the inner surface of the flange 66 rests against the bottom side 412A of the member 412.

Figure 4D:
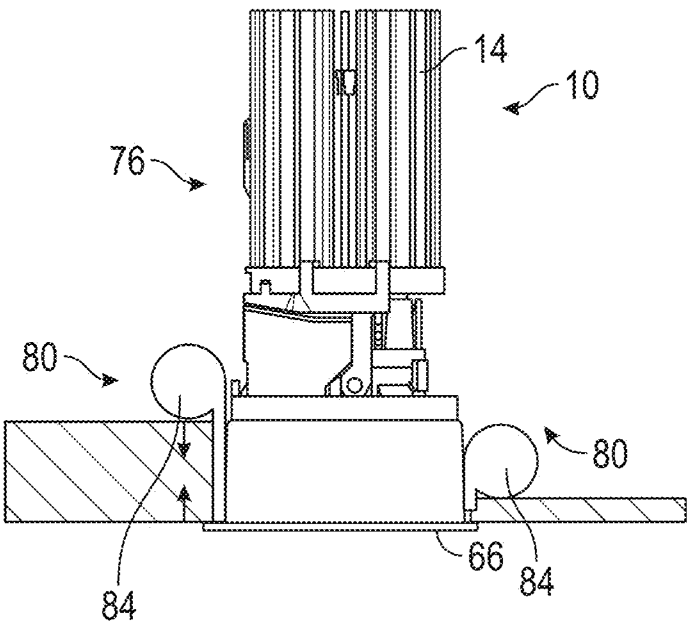
FIG. 4D is a luminaire illustrated to denote that the spring retention assembly can retain the luminaire firmly in place against member planes whose dimensional thickness may vary from job to job.

Referring now to FIG. 4D, the member 412 may not be uniform in thickness or may have various thicknesses. The spring retention assemblies 80 allow different thicknesses or ranges of thicknesses in ceiling height because the coil springs 82 and the spring housings 84 operate independently allowing the spring housings 84 to be at different position relative to the end 260 of the coil spring 82.

Figure 4E:
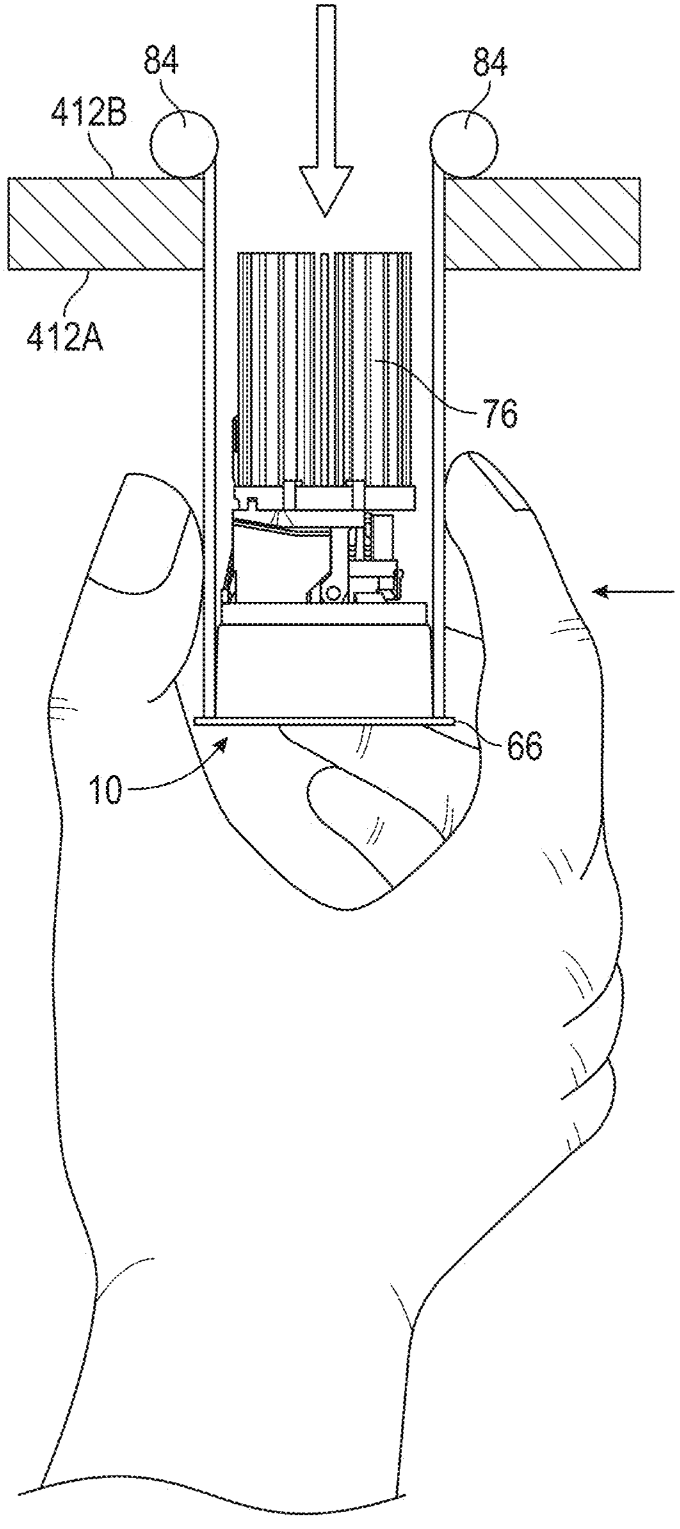
FIG. 4E is a luminaire partially removed from the member for servicing and replacement.

Referring not to FIG. 4E, the spring retention assembly 80 also allow for the retraction of the luminaire 10 from the opening 410. Retraction may be used for replacing or adjusting components in the luminaire 10. For example, replacing a light source or adjusting the lenses or the like. As is illustrated the spring retention assembly 80 push against the side 412B as the luminaire 10 is retracted. The coil springs resist the movement which is overcome by force. For complete removal the coil spring assembly can be moved into the opening. For partial retraction, the spring retention assemblies 80 may maintain their position. In the present example, many components are easily replaced. After retraction, the luminaire 10 may be pushed or allowed to return into place as in FIG. 4B. However, the spring retention assemblies 80 may be positioned as in FIG. 4E.

The tilt angle of the light is the central angle of light relative to the longitudinal axis (axis of insertion into the recess). The central angle of light is adjustable using the tilt mechanism subassembly. The central angle may be tilted and independently the beam spread or zoom of the light may be changed.

Referring now to FIGS. 5A-5D, the luminaire 10 and a first tilt mechanism subassembly 40 associated with the luminaire 10 is illustrated. However, FIG. 5A also illustrates the tabs 46 that secure the second arm 44 to the heat sink subassembly 14. As mentioned above, the tabs 46 fit within the recesses 48. The tabs 46 extend in a longitudinal direction and have a radial direction portion 50 that is secured around the upper surface 22A of the base 22. The lower surface 22B of the base is directly adjacent to the upper surface 52 of the second arm 44. Another way of stating this is that the distance between the radial direction portion 50 and the upper surface 52 is sized to fit the thickness C of the base 22. Although tabs 46 are illustrated other securing means mentioned above such as screws, rivets, fasteners and adhesives may be used to secure the second arm 44 to the base 22.

The second arm 44 has a first portion 510 that is partially circumferential about the luminaire 10. The first portion 510 extends about one half the circumference and therefore is partially ring-shaped. The first portion 510 of the second arm 510 has a bottom surface 512 that when the second arm 44 is in an untilted position, is directly adjacent to an upper surface 514 of the first arm. In the present example, the optical axis of the light source corresponds to the longitudinal axis 12 of the luminaire 10.

In this example, the second arm 44 has second portions 520 that extend generally perpendicular to the first portion 510. The second portion 520 receives the pin 56. The pin 56 forms a pivot point that may be constructed in various manners depending on the application. Each side of the second arm has one second portion 520. The second portions 520 have an opening 522, the diameter of which is sized to receive the outer diameter of the pin 56 to allow the second arm 44 to rotate relative to the first arm 42.

Figure 5A:
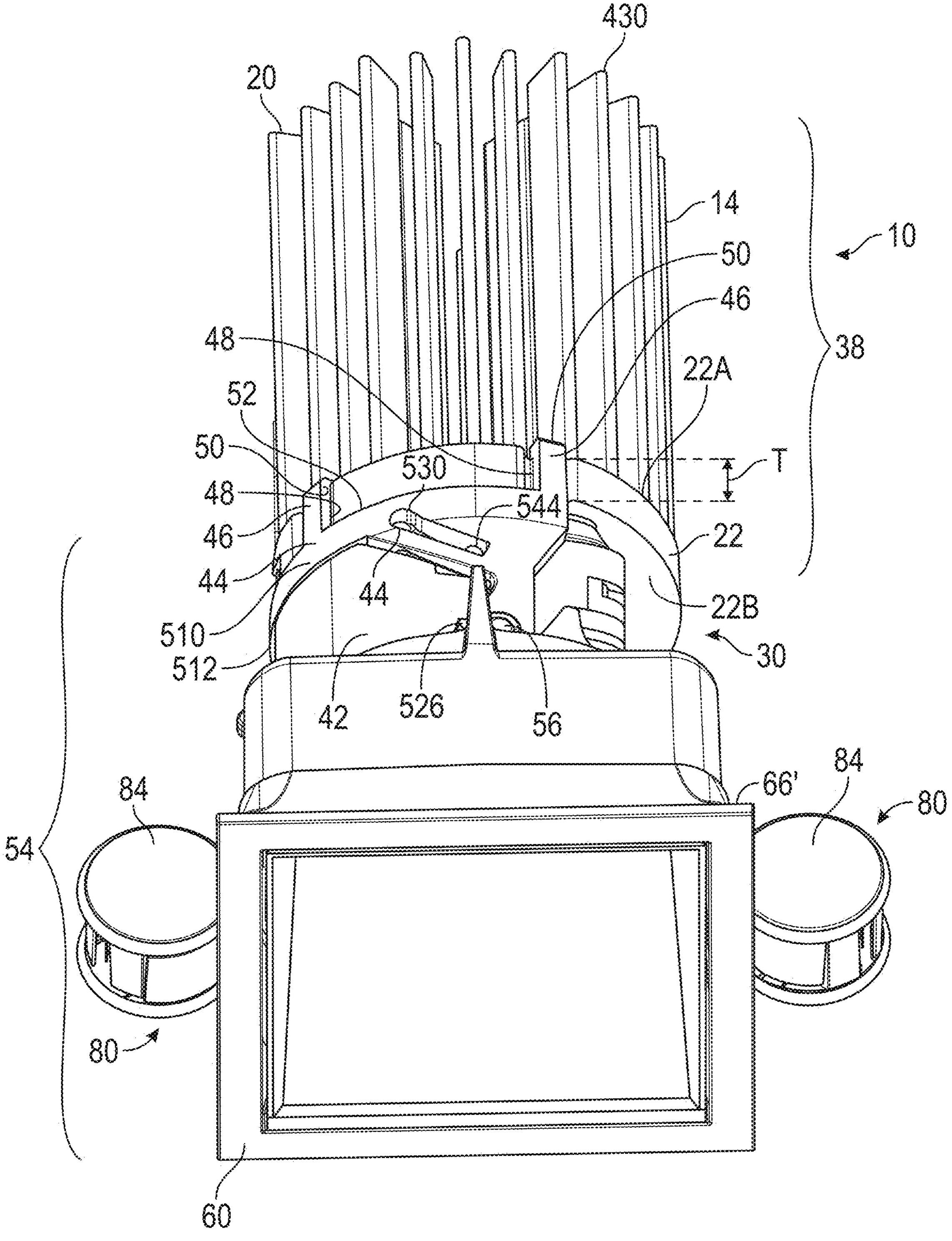
FIG. 5A is a side view of atilt mechanism
Figure 5B:
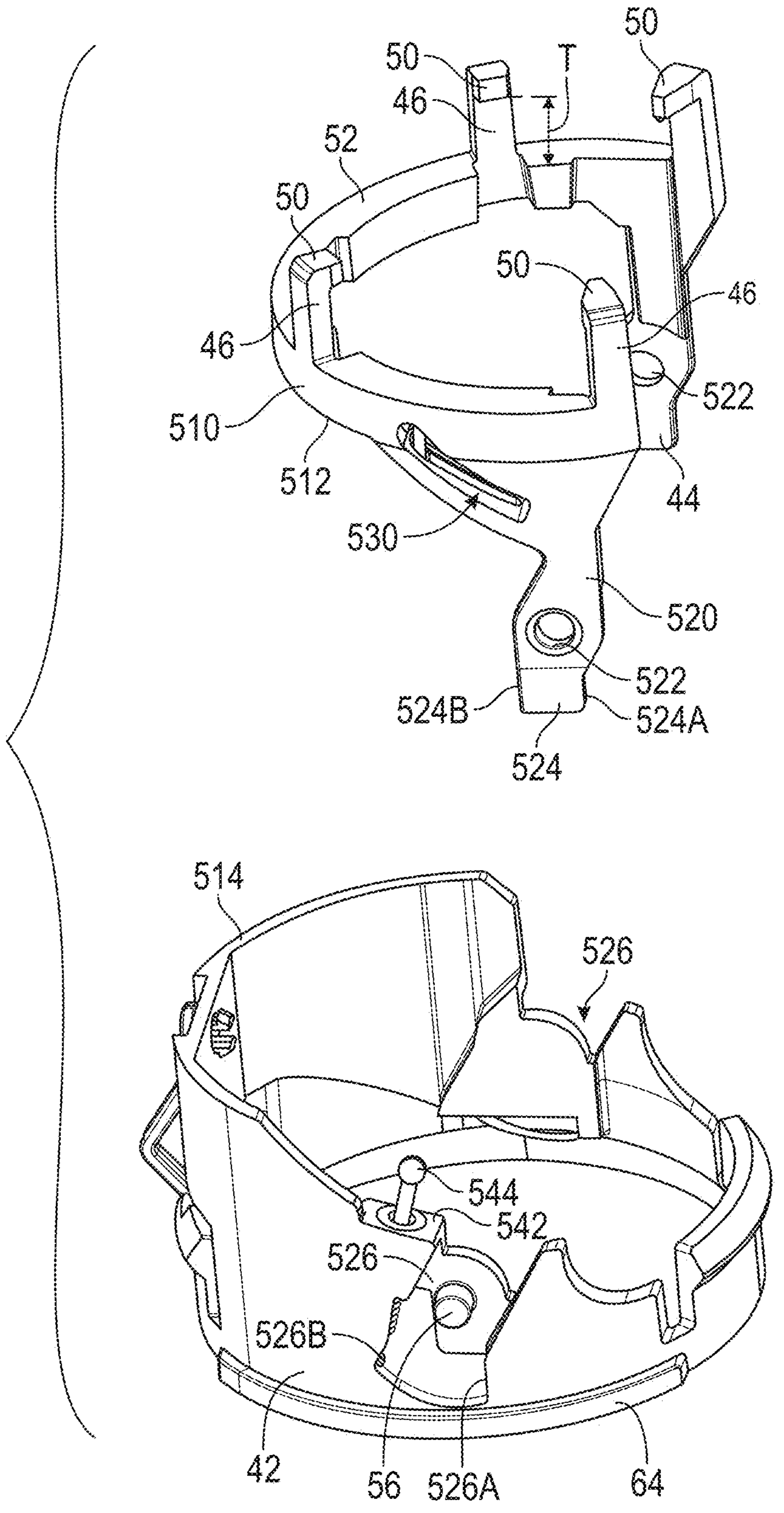
FIG. 5B is a partial exploded view of the arms of the tilt mechanism.
Figure 5C:
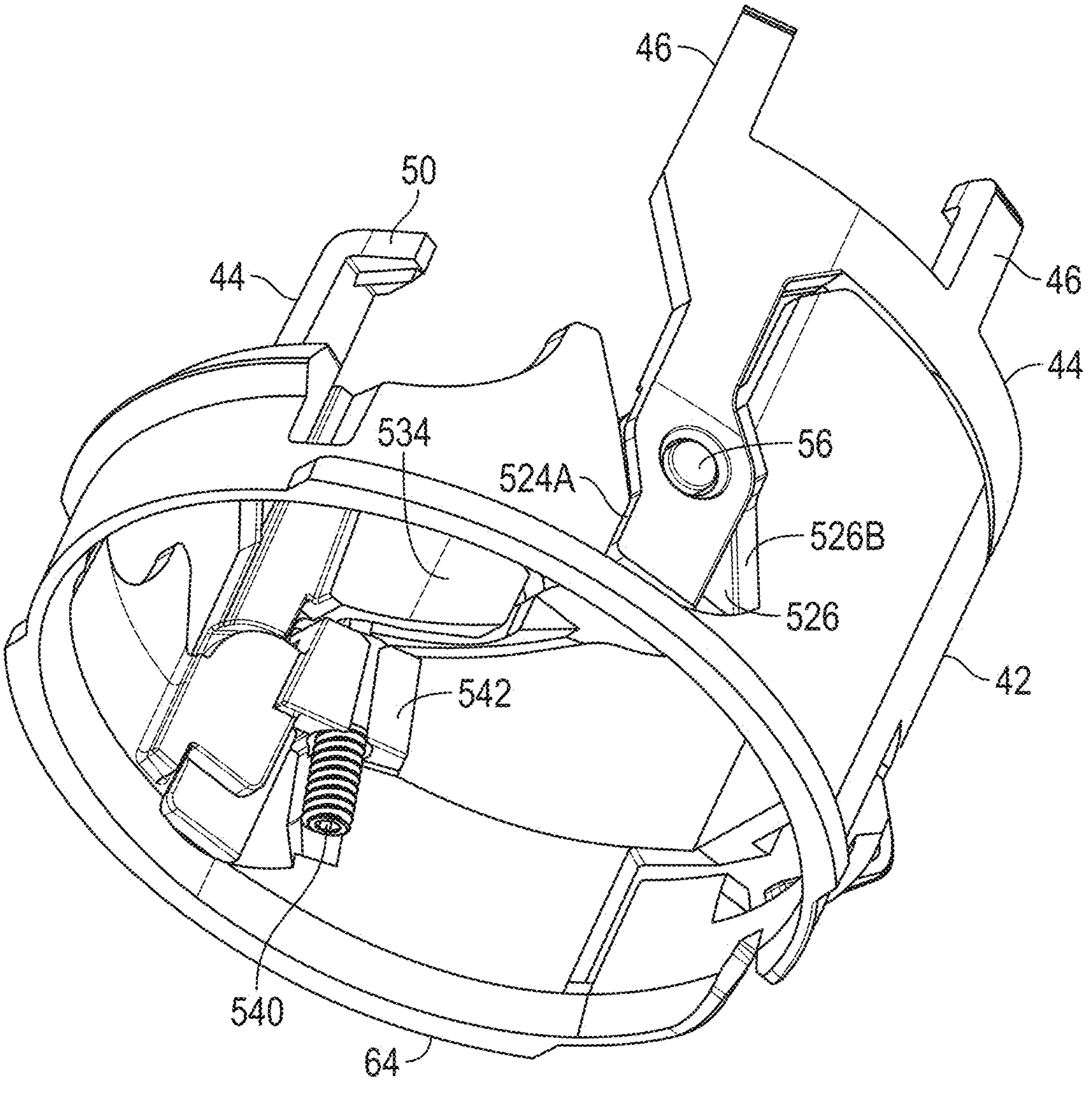
FIG. 5C is a bottom perspective of the first arm and the second arm of the tilt mechanism.
Figure 5D:
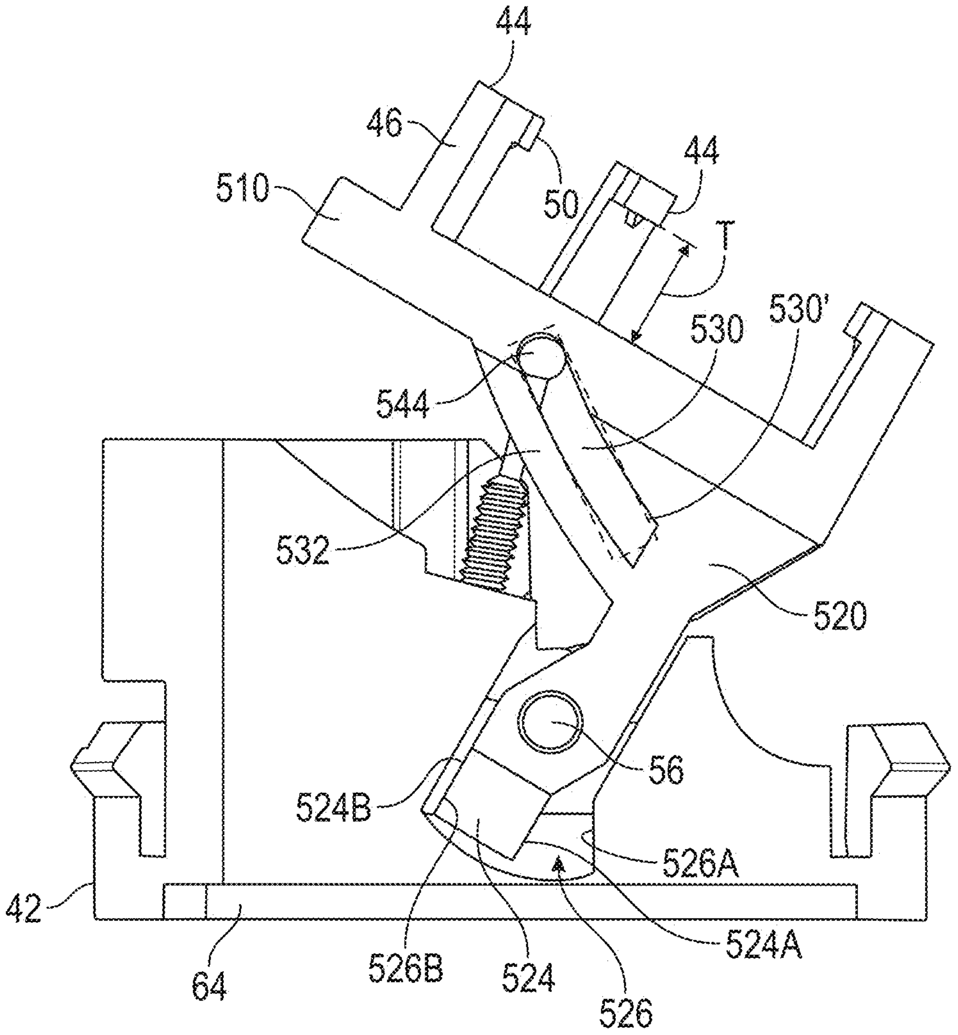
FIG. 5D is a side view of the first arm and the second arm of the first tilt mechanism.

The second portion 520 of the second arm 44 has an extension 524. The extension 524 has first edge surface 524A and a second edge surface 524B. The extension 524 fits within a recess 526 in each side of the first arm 42. The recesses 526 are radially inwardly from the outer surface of the first arm 42. The recess 526 thus forms a first abutment surface 526A and a second abutment surface 526B. In the most upright position, the abutment surface 526A is adjacent to the extension surface 524A. This is best illustrated in FIG. 5C. In the most tilted position, the abutment surface 526B is directly adjacent to the extension surface 524B.

The second arm 44 has a slot 530. The slot 530 may be curved as illustrated or straight. In one constructed example, a curved slot eased the ball head (described below) moving along the length of the slot without binding. The slot 530 extends between the first portion 510 of the second arm 44 and the second portion 520 of the arm 44. The slot 530 is formed between an outer wall 532 and an inner wall 534. The radial distance between the outer wall 532 and the inner wall 534 is sized to receive a member such as a shaft of a threaded fastener 540. The threaded fastener 540 is secured within the first arm 42 by a threaded retainer 542. In this example, the threaded fastener 540 has a ball head 544 that is received within the slot 530 as the threaded fastener 540 is rotated, the ball head 544 travels from the position illustrated in FIG. 5A to the position illustrated in FIG. 5D. The threaded fastener 540 may be a push rod, arm or member that engages the slot. The angular movement of the second arm 44 thus is defined by the length of the slot 530 and the distance that the threaded fastener 540 is allowed to travel. The threaded fastener 540 and the slot 530 are adjacent to the pin 56. In this example, no springs are required because the threaded fastener maintains its position using the threads. Slot 530 may also be a rectangular slot 530' rather than curved.

The tilt mechanism may also be used for non-lighting or other lighting applications. For example, a sound speaker may be employed rather than a light source.

Referring now to FIGS. 6A-6F, another example of a luminaire 10' is set forth with a tilt mechanism 40' different from that shown in FIGS. 5A-5D. In this example, the tilt mechanism subassembly 40' has a modified second arm 44'. In this example, the second portion 520' of the second arm 44 is modified to not include the curved slot 530. Further, a threaded fastener 610 without a ball head as illustrated in FIGS. 5A-5D is provided in a similar location. Of course, the other types of members, rods, or pins may be used in this example too. The retainer 542 retains the threaded fastener 610 therein. The threaded fastener 610 pushes against the bottom surface 512 of the first portion 510 of the second arm 44. As the threaded fastener 70 is extended, the bottom surface 512 of the second arm 44 moves in an angular direction around the pin 56 as the axis of rotation 58.

Figure 6C:
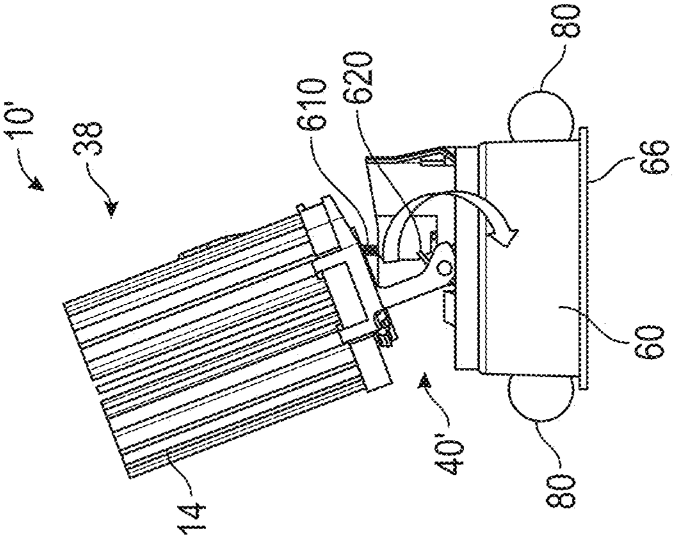
FIG. 6C is the opposite side view of that shown in FIG. 6B of the tilted luminaire.
Figure 6B:
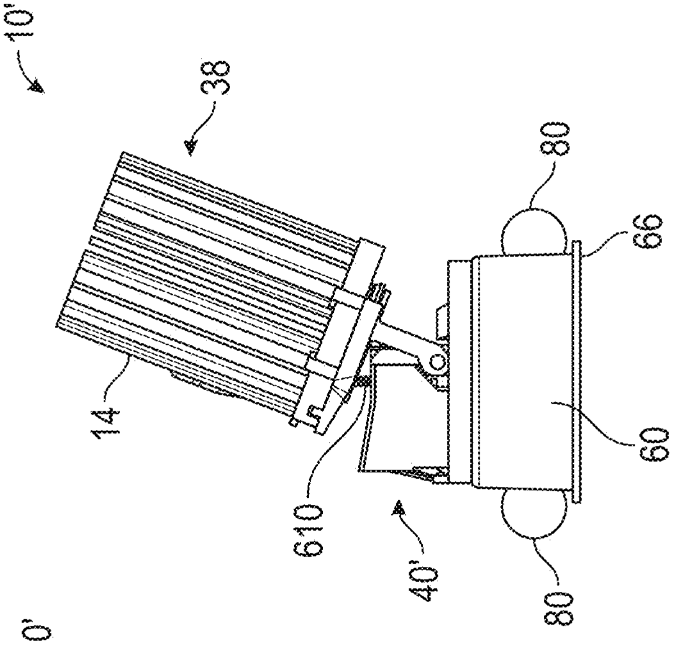
FIG. 6B is a side view of the luminaire in a tilted position.
Figure 6A:
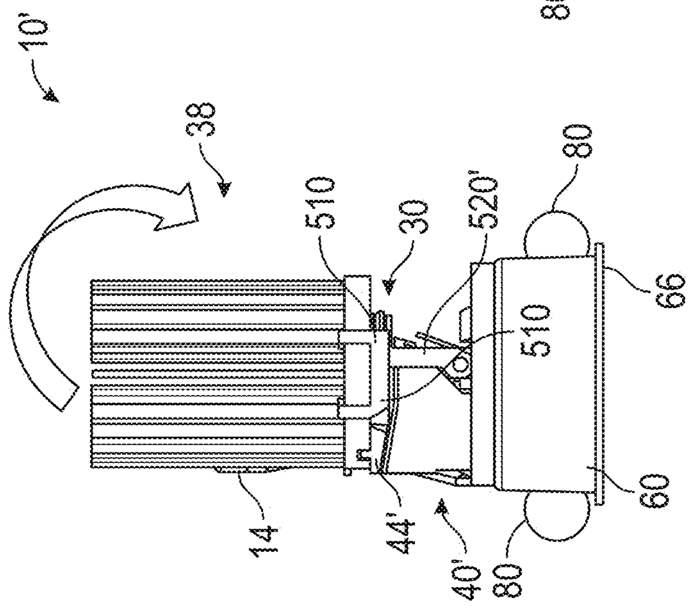
FIG. 6A is a first side view of an un-tilted luminaire with a tilt mechanism.
Figure 6D:
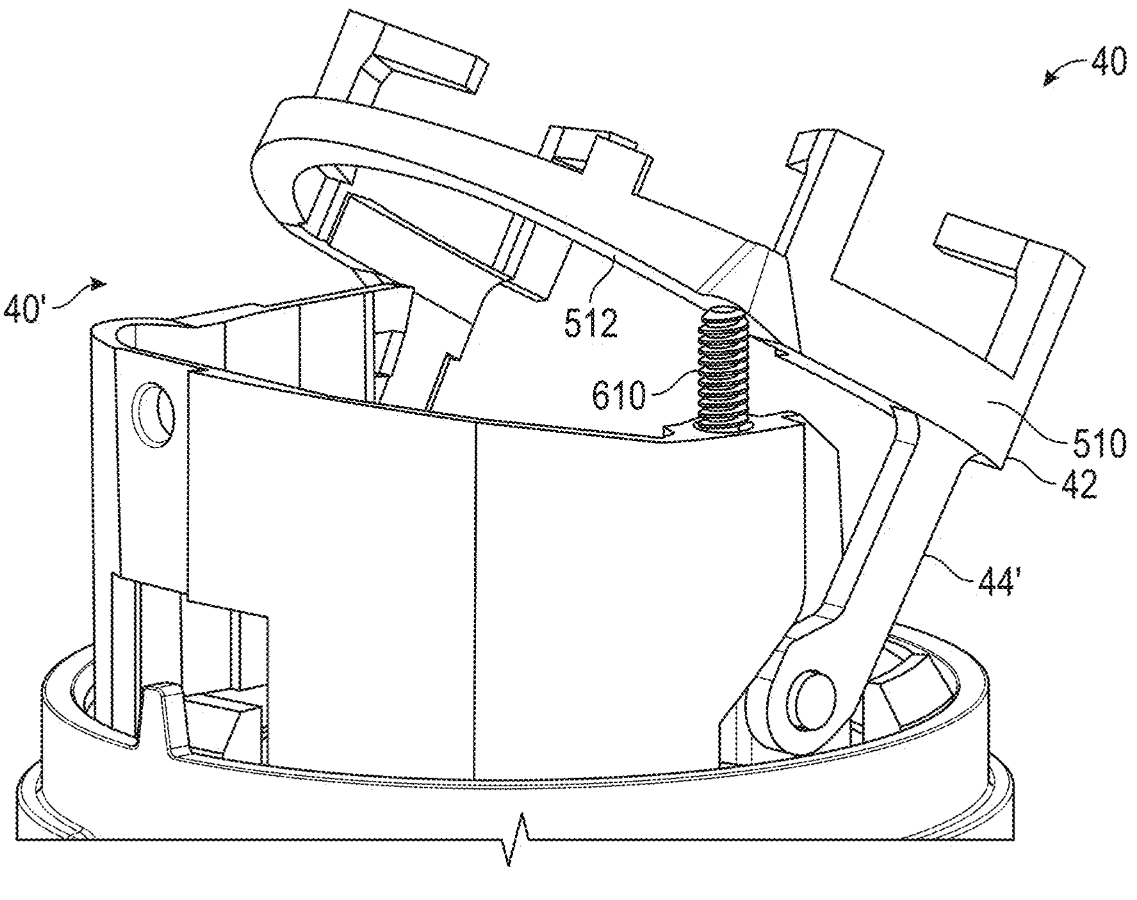
FIG. 6D is a perspective view of the tilt mechanism of FIG. 6A-6C.
Figure 6E:
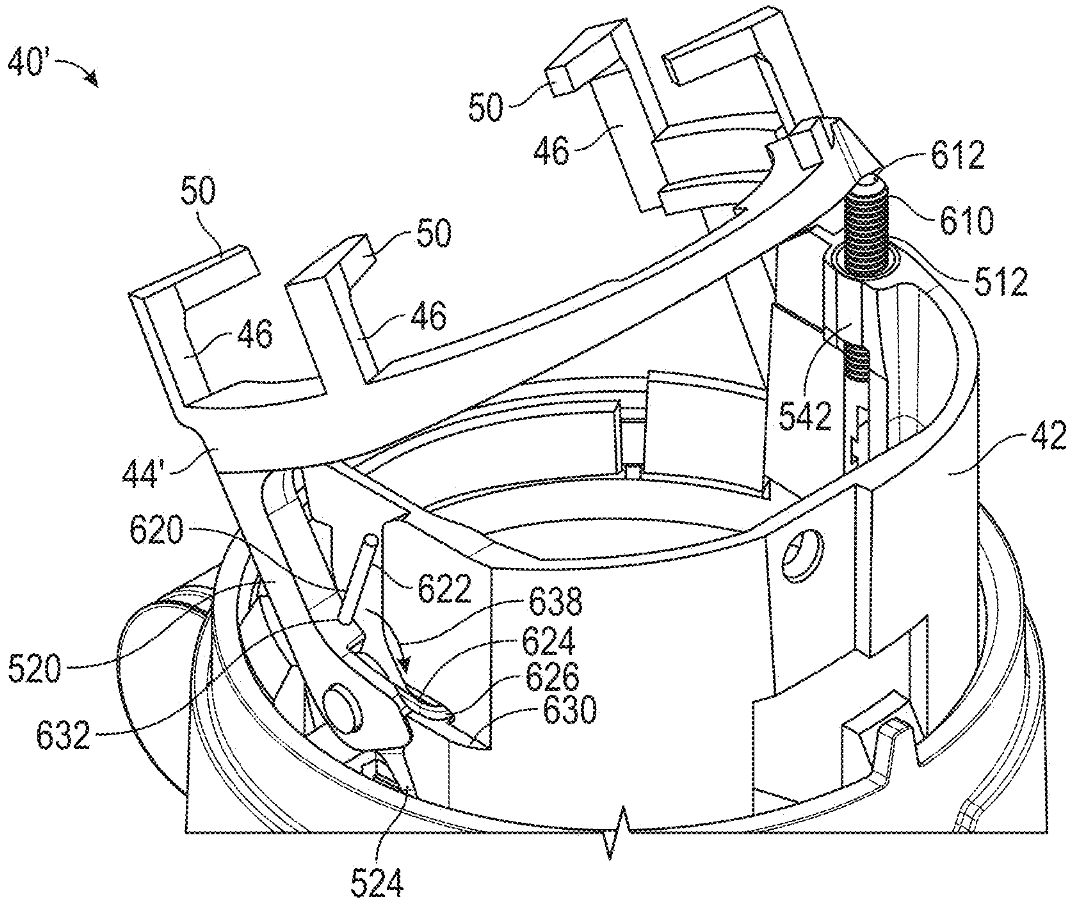
FIG. 6E is a close up perspective view of another tilt mechanism with a threaded fastener and a torsion spring.
Figure 6F:
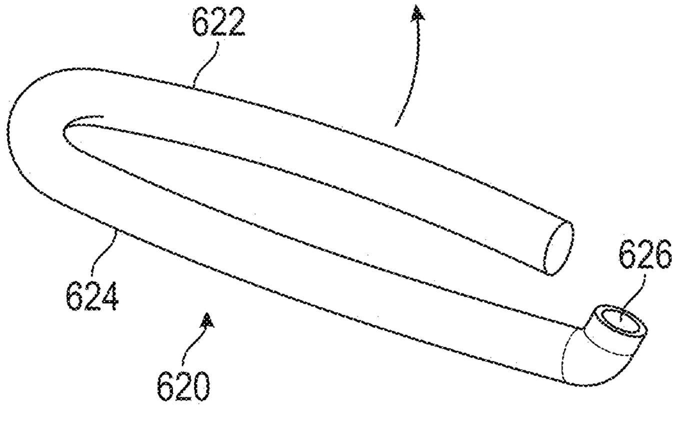
FIG. 6F is a perspective view of the spring of the tilt mechanism.
Figure 6G:
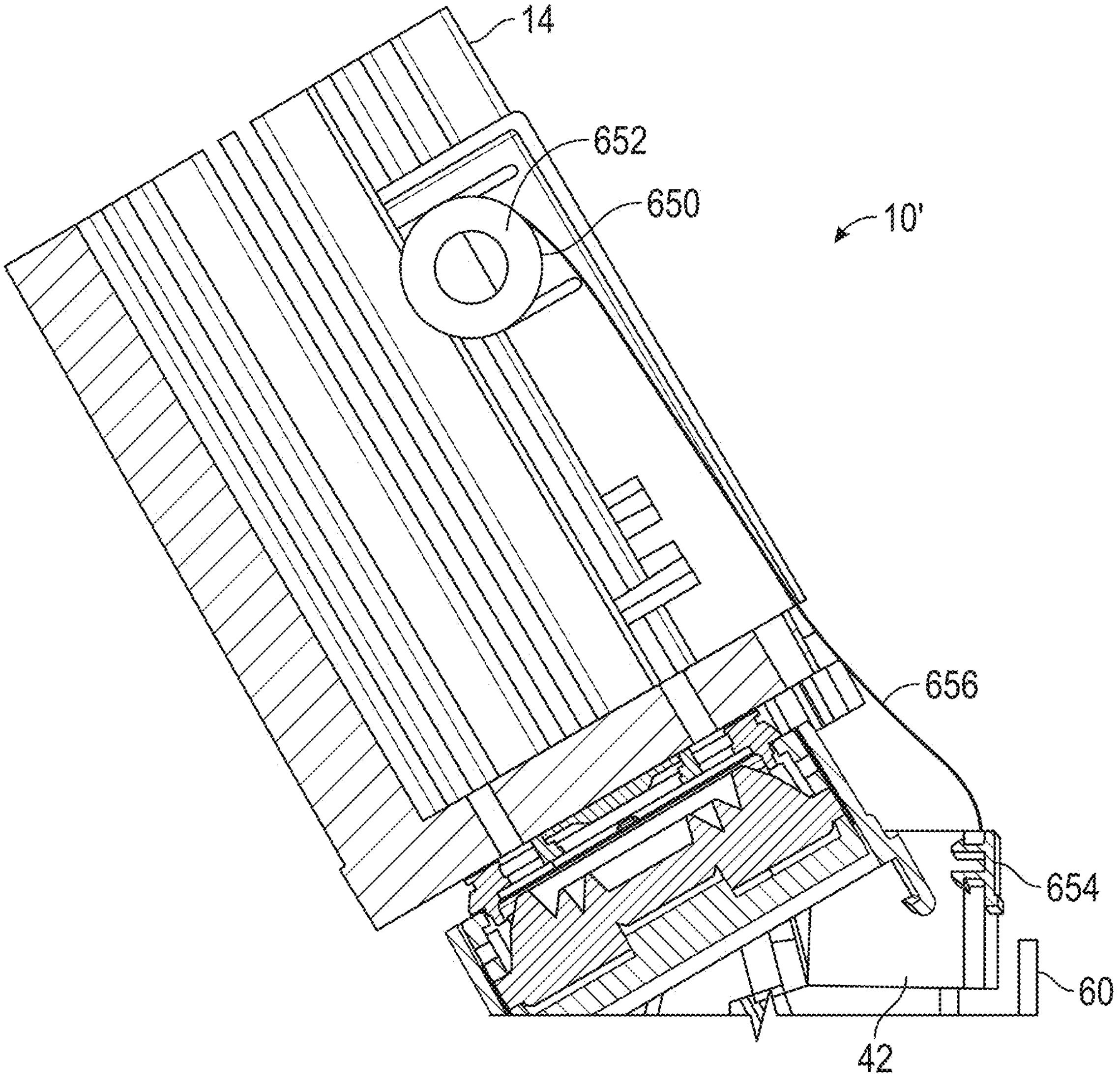
FIG. 6G is a constant force spring that may be used in previous embodiments.

A resistance means such as a torsion spring 620 illustrated in an unbiased position in FIG. 6F is used. Other resistance means such as a living hinge or flat springs may be used. The torsion spring 620 has a first arm 622, a second arm 624 and a retainer arm 626. In this example, the torsion spring 620 is located on the opposite side of the second arm 44 from the threaded fasteners 610. As is best shown in FIG. 6E, a receiver 630 receives the retainer 626. The receiver 630 is a hole or channel that extends inward or in a radial direction into the first arm 42 or the tilt mechanism sub assembly 40'. The first arm 622 of the torsion spring 620 is received within a channel 632. In FIG. 6F, the torsion spring 620 is shown in an unbiased position. In FIG. 6E, the second arm 44' is tilted when the threaded fastener 610 is extended upward so that the upper surface 612 pushes against the bottom surface 512 of the second arm 44'. As the second arm 622 of the torsion spring 620 is moved by the second portion 520 by being engaged in the channel 632, the torsion spring 620 is in a biased position and provides a counterforce to the threaded fastener 610 pushing the second portion 520 of the second arm 44' into the tilted position. That is, the torsion spring 620 tries to move the second portion 520 of the second arm 44 in the direction illustrated by the arrow 638 and return the upper body 38 and therefore the heat sink subassembly 14 to a vertical position (when the luminaire 10' is installed in a vertical position). In other words, the torsion spring 620 tries to align the second arm 44' and the heat sink subassembly 14 toward alignment with the longitudinal axis 12 of the luminaire 10'.

An adjustment tool (not shown), such as screwdriver or an Allen wrench, may be used to move the threaded fastener 610 in a clockwise or counterclockwise position to extend or retract the threaded fastener 610 from the retainer 542.

Referring now to FIG. 6F, a constant force spring 650 is used in place of the torsion spring 620. The constant force spring 650 may be formed by a coil spring as illustrated above with respect to the spring retention assembly 80. The constant force spring 650 has a first portion 652 coupled to the heat sink subassembly 14 and a second portion 654 coupled to the first arm 42. Of course, the second portion 654 may be coupled to the trim piece 60 or other stationary component. The constant force spring urges the tilted second arm 44 and the heat sink subassembly 14 toward the vertical position. The threaded fastener 610 illustrated in FIG. 6A-6E may be used to move the second arm into the desired position. As the threaded fastener 610 is retracted, the second arm 44 is forced to maintain contact with the upper surface 612 of the threaded fastener 610 when the threaded fastener 610 is fully retracted, the constant force spring 650 is also retracted. The first portion 652 is fixedly mounted to the moving portion of the luminaire 10'. The second portion 654 may comprises a connector or the like. A spring or retractor may be located in the first portion 652, a connection member 656 couples the first portion 652 and the second portion 654. The connection member 656 may be a cord or spring coil. The connection member 656 may be constantly in tension. The connection member 656 may also be the spring 650 itself.

Figure 7A:
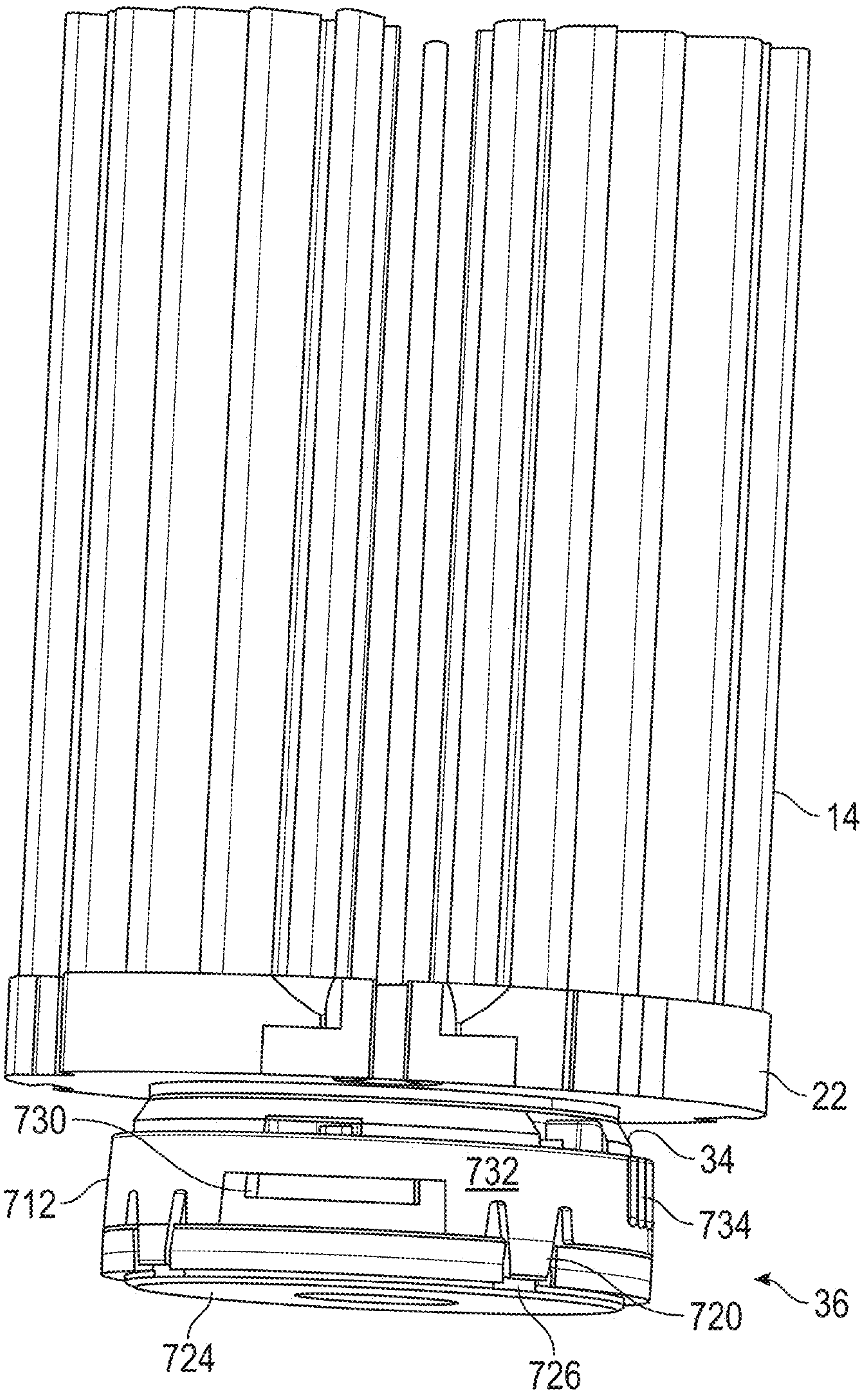
FIG. 7A is a perspective view of an optic assembly coupled to an heat sink assembly.
Figure 7B:
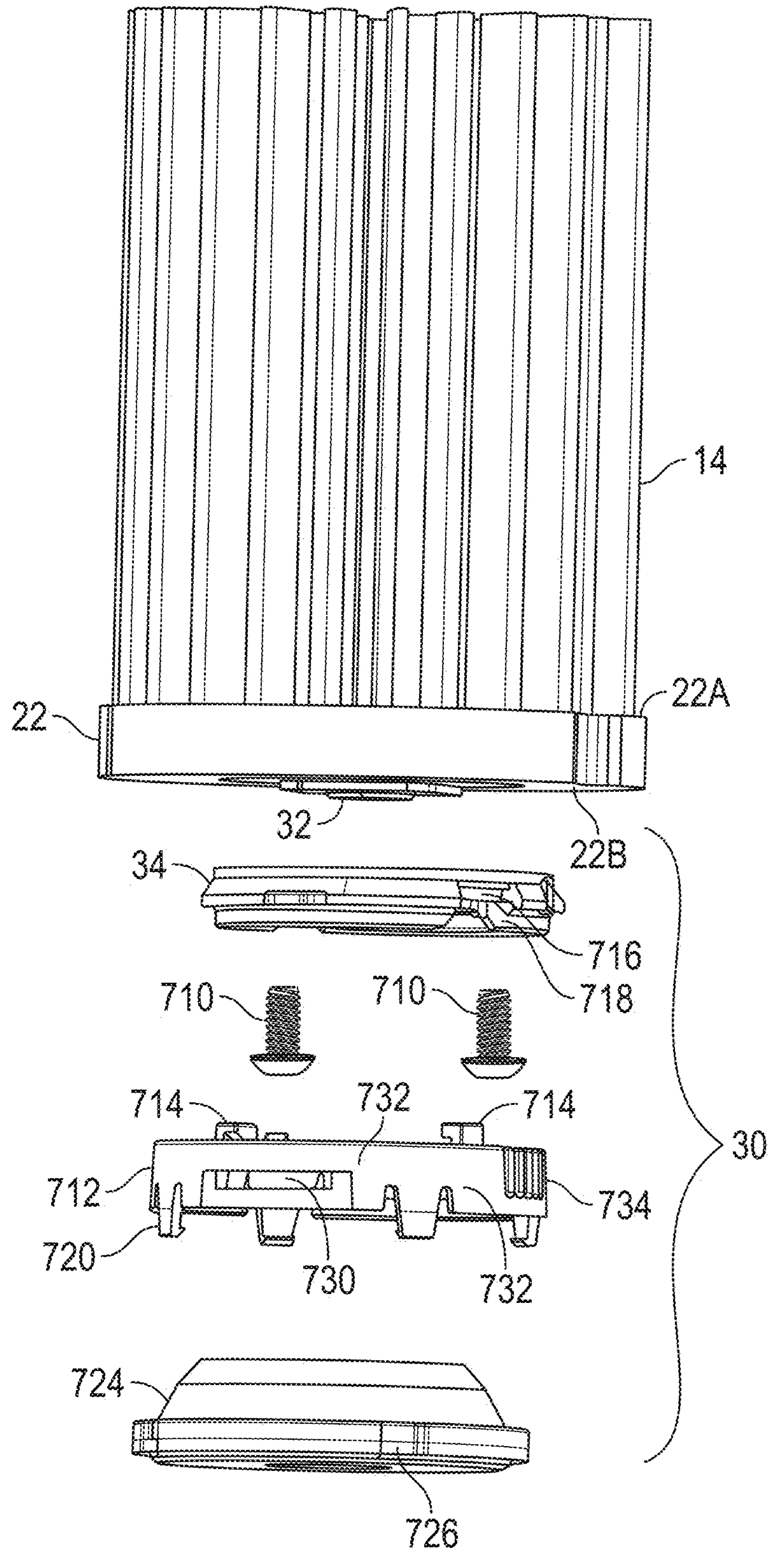
FIG. 7B is a side exploded view of FIG. 7A.

Referring now to FIGS. 7A and 7B, one example of the optic assembly 30 is illustrated. In this example, the optic assembly 30 comprises the mount 34. The mount 34 is disposed around the light source 32. The mount 34 is secured to the lower surface 22B of the base 22 using the threaded fasteners 710. A lens holder 712 has a plurality of retainers 714 that extend radially inwardly. The retainers 714 engage a retaining slot 716 formed by a tab 718 disposed on the mount 34. The tab 718 extends circumferentially to leave the slot 716 to engage the retainer 714. The retainer slot 716 may be shaped and sized to provide an opening so the retainer 714 may be inserted in the vertical direction and rotated into the retainer slot 716 several degrees to be held against the tab 718. In the present example, two slots 716 formed by two tabs 718 are used. However, more or fewer slots 716 and tabs 718 may be used.

A plurality of lens retainers 720 may be disposed on the opposite side as the retainer 714. The lens retainers 720 are used to secure the lens 724 to the lens holder 712. The lens 724 may have optics to provide a fixed amount of beam spreading. The lens retainer 720 fit within recesses 726 to maintain the lens 724 in a fixed position relative to the lens holder 712 so the lens does not rotate. Of course, recesses may be disposed on the lens holder 712 while the while the retainer is disposed on the lens 724. Of course, other means to secure the lens and retainers may be used.

The lens holder 712 may also have a slot 730 disposed therein. The slot 730 is in a side wall 732 of the lens holder 712.

A plurality of detents 734 may be formed in the side wall 732. The detents 734 are formed as vertical recesses that are spaced apart. In the present example, five detents 734 are provided. The operation of the slots 730 and the detents 734 are further described below with respect to FIGS. 8A-8F. In this example, two sets of slots 730 and two sets of detents 734 are disposed on opposite sides of the side wall 732. However, more or fewer slots and detents may be used. Of course, the detents and slots may be eliminated if only a fixed lens is desired. Other types of feedback devices may be uses besides detents. A rubber overmold on the holder sidewall 732 may be used to create an interaction with tab 842 to allow for infinite adjustment while ensuring lockability of the position.

When beam spreading is desired to be changed, the zoomable optics may be adjusted. Zoomable means changing the amount of beam spreading. Beam spreading refers to the angular width of the beam relative to a central axis of the beam direction. The amount may vary depending on the optics and the amount of rotation. Beam spreading is typically measured in degrees from the central axis or direction. Without tilting the central beam angle is the longitudinal axis.

Referring now to FIGS. 8A-8F, one problem with fixed optic distribution is that multiple unique optics have to be used to achieve different light distributions from a given source. For some products fixed optics are acceptable. In FIGS. 8A-8F, an adjustable optic subassembly 30' is provided. The adjustable optic subassembly 30' provides discrete indexing from a single optic assembly. Predetermined positioning allows a single optic to provide specified distributions for flexibility when needed and consistency across multiple luminaires if needed. The example also allows for the easy addition of other optical devices/accessories by an end user to further customize the output of the fixture. The present mechanism allows consistency when setting optical distribution across multiple luminaires. Of course, without the indexing features, infinite adjustments may be performed.

In FIGS. 8A-8F, the lens holder 712 is as described above in FIGS. 7A and 7D. The light source 32 and the mount 34 are not illustrated in FIGS. 8A-8F. In the present example, the slots 730 and the detents 734 are used as described below. In this example, a lower lens holder 810 is used to hold a lower lens 812. The lower lens 812 is optically coupled to the upper lens 724. That is, the light from the light source 32 travels through and is changed by the lens 724. The light from the first lens 724 then is changed by the lower lens 812. The changes in this example allow the beam spread from the optical assembly to be changed within a certain range. Changing either or both lenses may allow other beam spreads to be achieved. The lower lens 812 has extensions 814 that extend outward in a radial direction. In the present example, four extensions 814 are used. However, more or fewer extensions may be provided. The extensions 814 engage notches 816 in the inner part of the outer wall 818 of the lower lens holder 810. The extensions 814 and notches 816 are a securing mechanism. The notch 816 is a reduced thickness portion of the outer wall 818 that has a depth 820 to accommodate the extensions 814 as is best illustrate in FIG. 8E. The interaction of the extensions 814 and the notch 816 prevent the lower lens 812 from rotating relative to the lower lens holder 810. Of course, the notches and extensions may be reversed. The notches may be in the optics and the extensions on the lens holder.

Figure 8A:
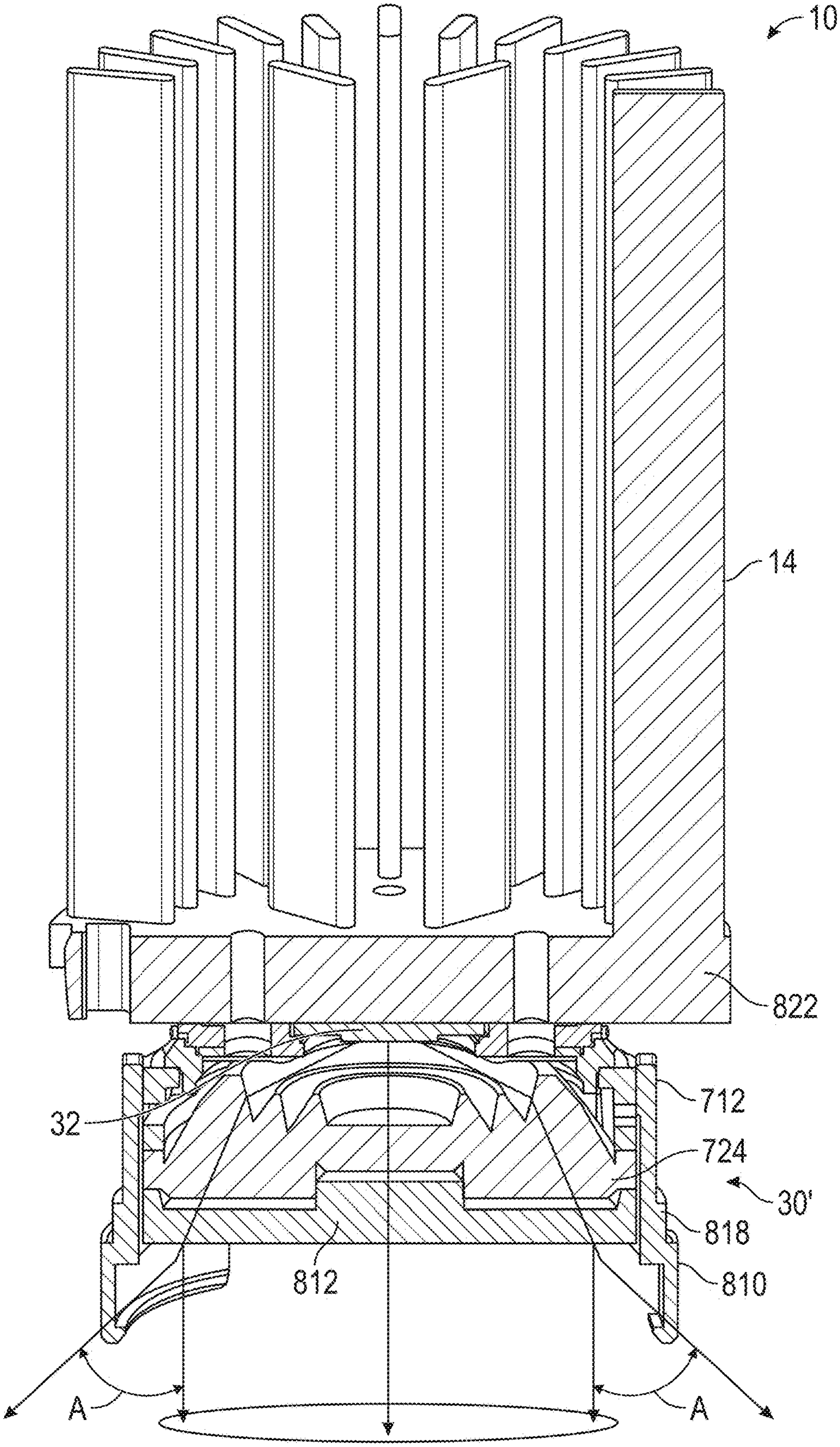
FIG. 8A is a cross sectional view of a holder holding adjustable lenses.
Figure 8B:
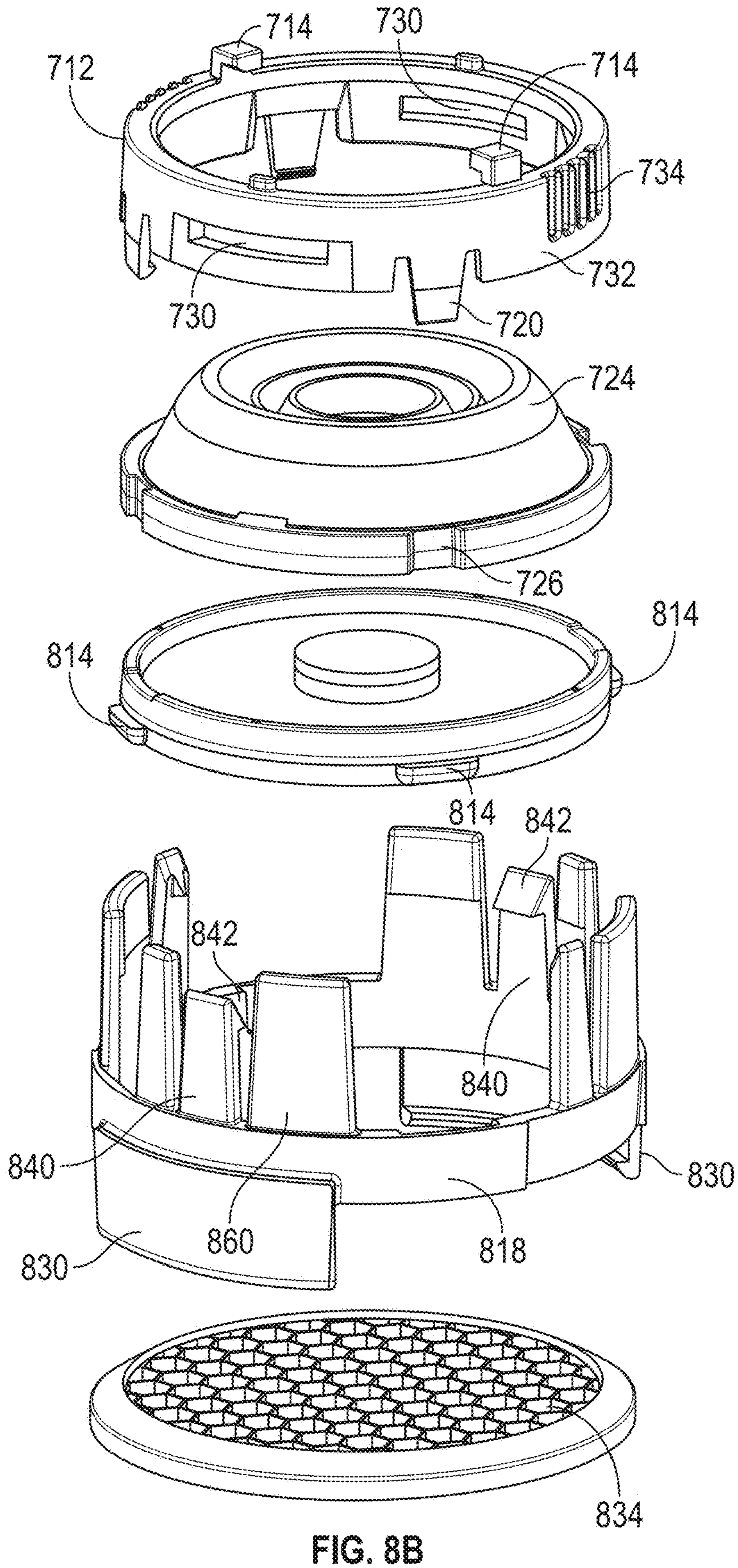
FIG. 8B is an exploded view of the holder and lenses of FIG. 8A.
Figure 8C:
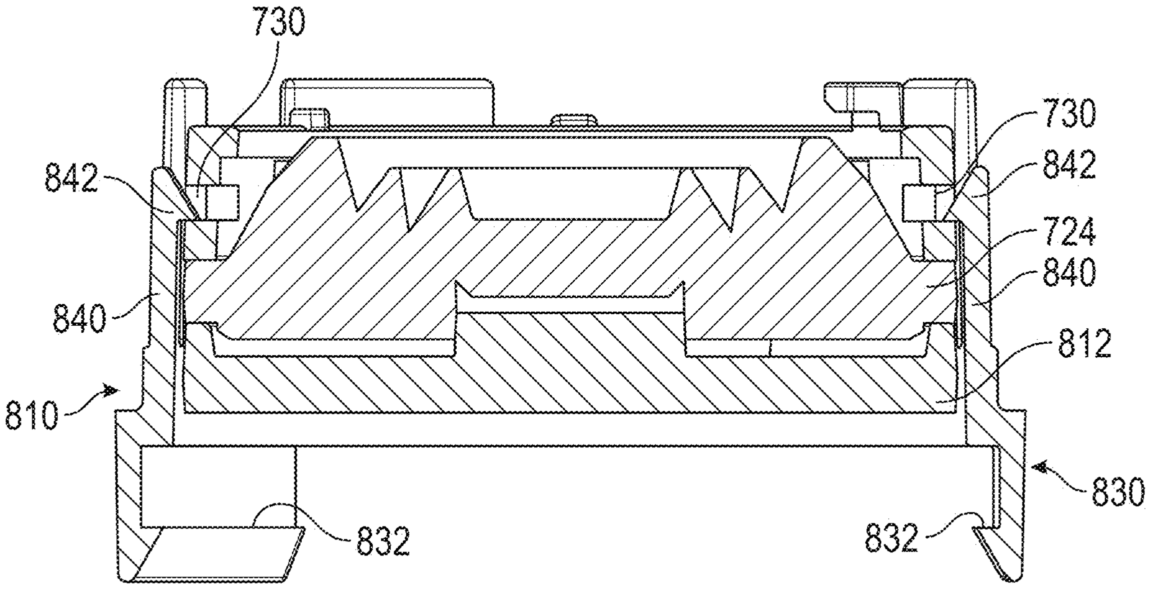
FIG. 8C is a first cross sectional view of the holder and lenses of FIG. 8A.
Figure 8D:
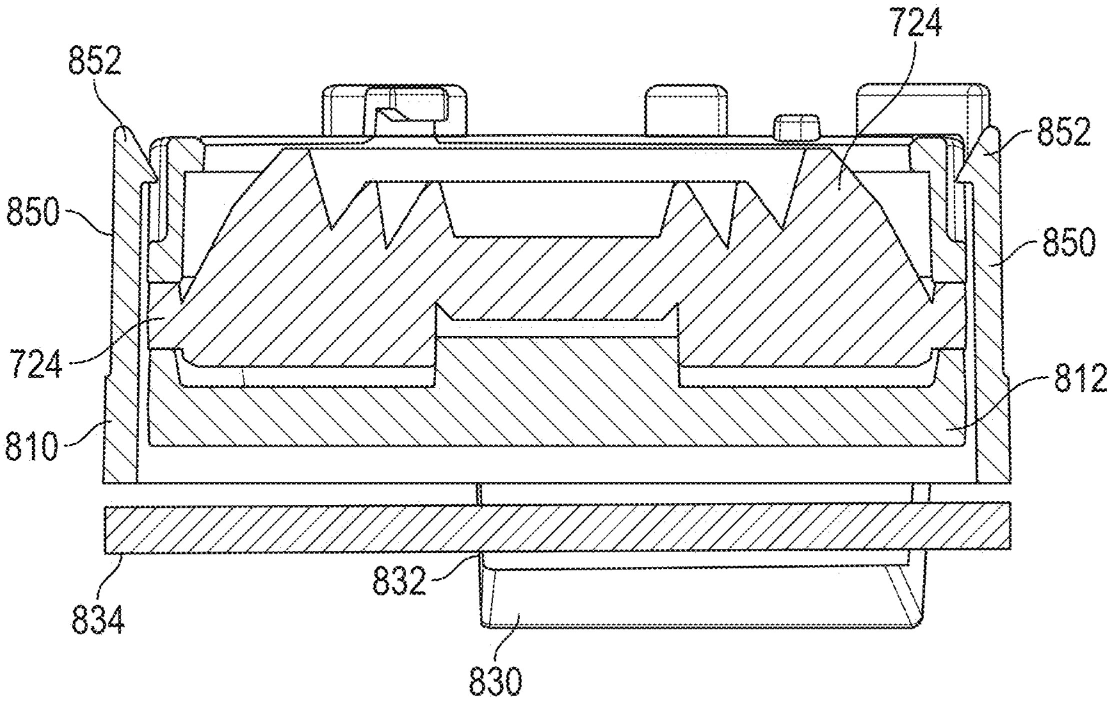
FIG. 8D is a second cross sectional view of the holder and lenses having an accessory coupled thereto.

The outer wall 818 may also include an accessory holder 830. The accessory holder 830 may be used to hold an accessory such as color lens, a diffuser or the like. The accessory holder 830 may extend in a longitudinal direction from the outer wall 818 in a downward direction. The accessory holder 830 may be shaped to accommodate various types of accessories 834 as illustrated in FIG. 8D. The accessory holder 830 has a tab 832 that is used to secure the accessory 834 to the outer wall 818 of the lower lens holder 810. The accessory holder 830 may be flexible to allow the tabs 832 to flex to accommodate the insertion of the accessory 834 therein. The accessory may also be held in place by other means such as a magnet, adhesives or fasteners. The accessory 830 be but not limited to a diffuser, a louver, a filter, an optical element, and a beam shaper.

The lower lens 810 is able to rotate relative to the upper lens holder 712. This, in turn, rotates the lower lens 812 relative to the upper lens 724 to change the beam spread from a maximum beam spread to a minimum beam spread as is generally illustrated in FIG. 8A by the angle A. The amount of beam spread may change depending upon the optics within the lens 724 and the lower lens 812. That is, the beam spread may be tuned to provide the desired optics. In this example, the movement of the lower lens holder 810 is restricted by the slots 730. In this example, fingers 840 are associated with each of the slots 730. A tab 842 at the end of each finger 840 extends radially inwardly into the slots 730. This is best illustrated in the cross section of FIG. 8C. Thus, the extent of the movement of the lower lens holder 810 is restricted by the position of the tabs 842 within the slots 730.

To provide feedback during positioning of the lower lens 812 relative to the upper lens 724, the detents 734 on the upper lens holder 712 are used. Detent fingers 850, as illustrated in FIG. 8D, have a tab 852 extending radially inwardly therefrom. The detent fingers 850 and the tab 852 engage the detents 734 during rotation of the lower lens holder 810 relative to the upper lens holder 712. In one constructed embodiment, each detent 734 changes the beam spread by 5°. Of course, other types or beam spreads may be accommodated depending on the optics of the lens 724, 812. The tabs 852 move in and out of the various detents 734 as the lower lens holder 810 is moved. The detents 734 are shaped to only mildly resist the movement and allow the tabs 852 to move from detent to detent while providing feedback to the person making the adjustment. It should be noted that the fingers 840, the tab 842, the detent finger 850 and the tab 852 may be formed of plastic so that the fingers are able to be moved and be assembled with some flexibility. Further, other types of dents or feedback mechanisms may be employed such as rods, slots, tangs or gears.

Figure 8E:
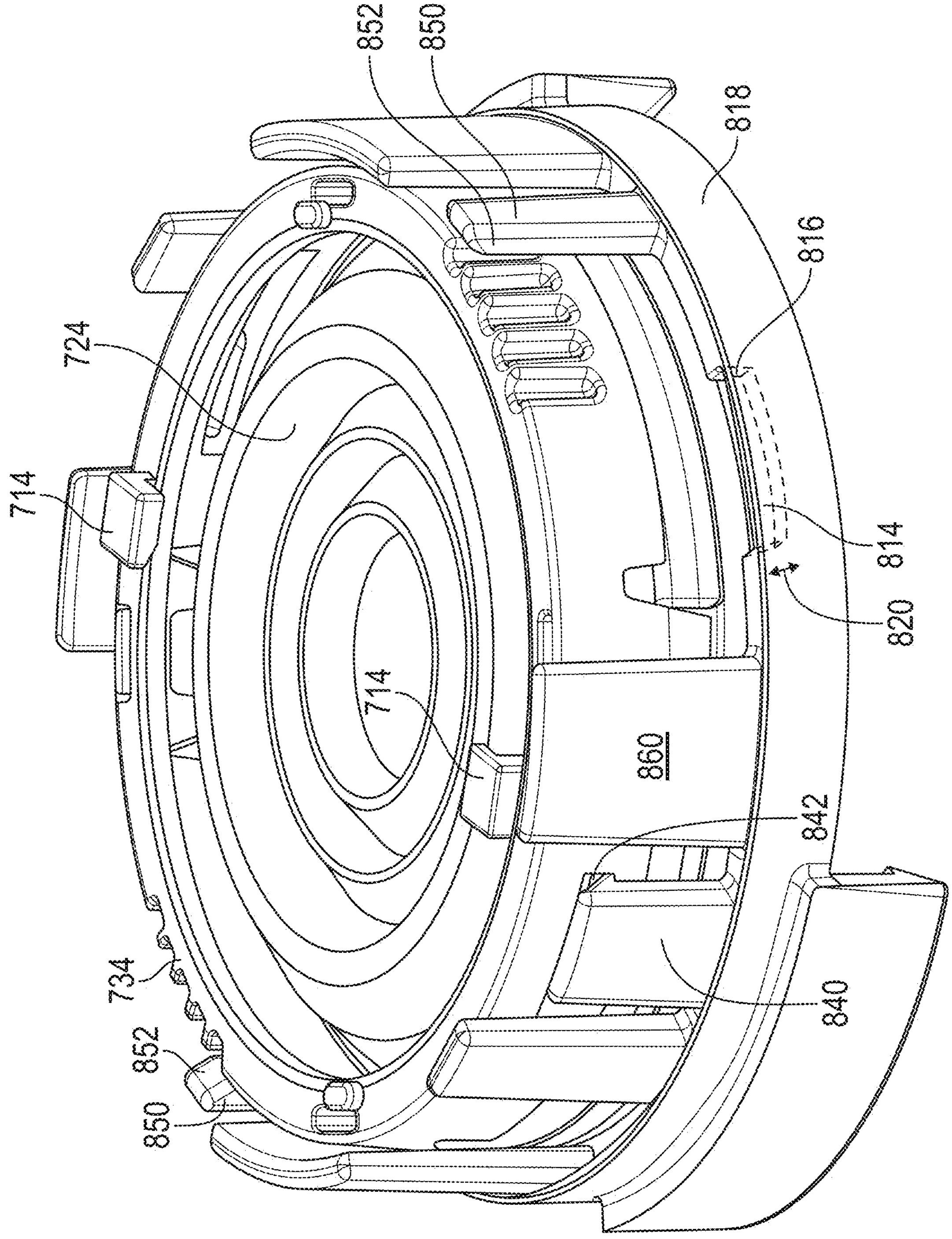
FIG. 8E is a perspective view of the holder and lenses in a first position.
Figure 8F:
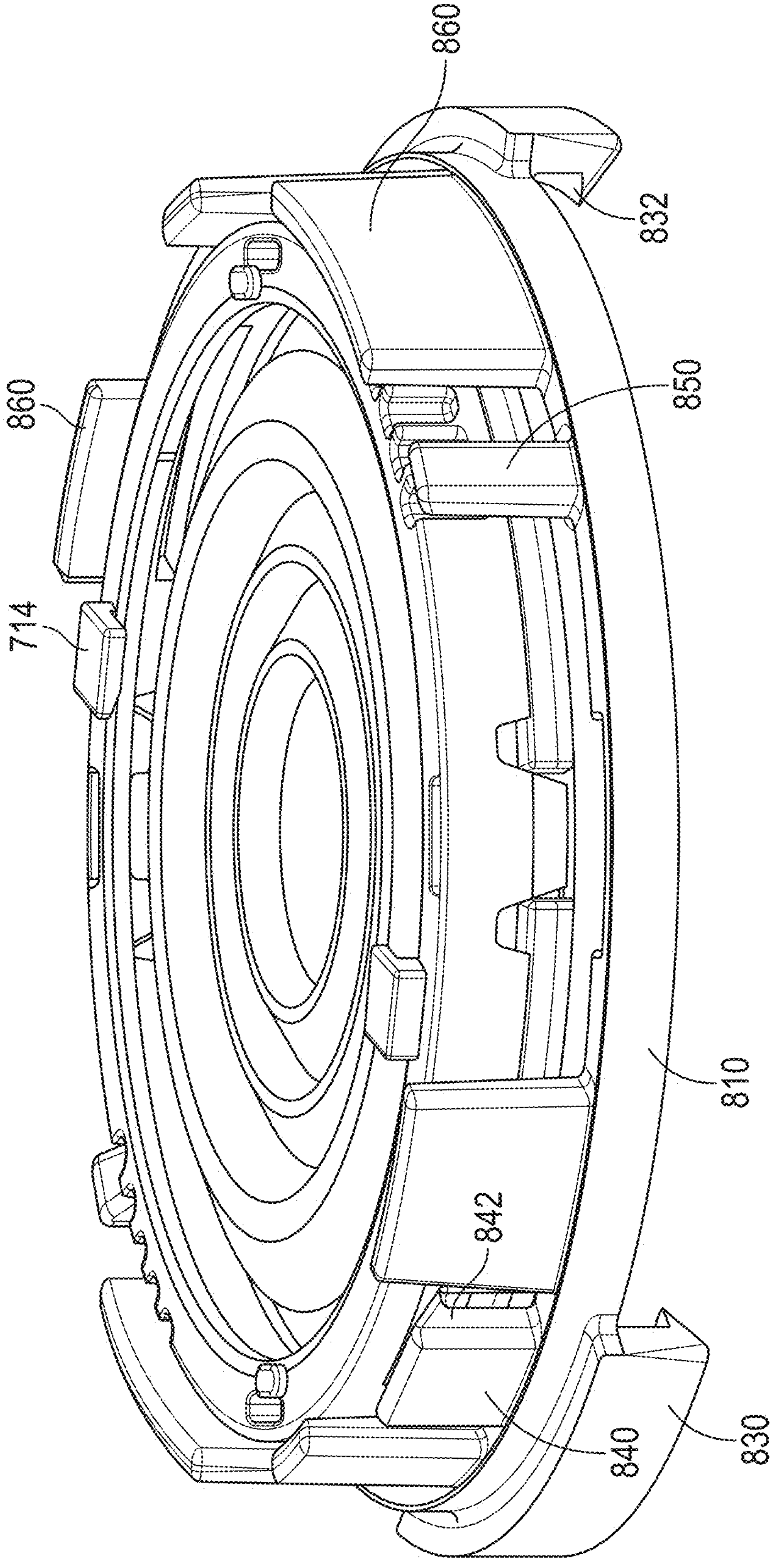
FIG. 8F is a perspective view of the holder and lenses in a second position.

Referring now to FIGS. 8E and 8F, the extent of the movement of the lower lens holder 810 is illustrated relative to the upper lens holder 712. In FIG. 8E, the lower lens holder, when viewed in the downward direction, is at the counterclockwise-most position. In FIG. 8F, the lower lens holder is at the clockwise most position. The view "downward" is the direction the light travels through the lenses from the light source 32 in a generally longitudinal direction.

As the light rays are emitted from the light source 32, Fresnel features on the lenses 724, 812 provide the desired beam spread.

Guide walls 860 extend in an upward direction from the lower lens holder 810. The inner diameter of the guide wall is the same or just larger than the outer diameter of the upper lens holder. In this manner, the guide walls 860 allow the lower lens holder 810 to move relative to the upper lens holder.

Referring now to FIGS. 9A-9F, a wall wash light assembly or luminaire 10" is illustrated. For luminaires, it is desirable to illuminate the wall 906 from the ceiling 908 down to the floor. Traditional reflectors add cost and complexity and require large sizes in order to work. The present disclosure provides a relatively small and aesthetically pleasing luminaire 10". The luminaire 10" also allows the illumination of the plane of the ceiling 908 in the area between the luminaire 10" and the wall 906.

The luminaire 10" is similar in construction to that illustrated above and therefore the same reference numerals would be used for the same components. In this example, a rectilinear (rectangular or square) lower body 54' is illustrated. However, other shapes such as round may be used. The lower body 54' may include a trim piece 60' and or the baffle subassembly 70". The lower body 54" may be formed of a single piece including the baffle subassembly 70" and the trim piece 60'. The trim piece 60' has a flange 66. As mentioned above, the trim piece 60' has a baffle subassembly 70" disposed therein. The baffle subassembly 70" is shown in an exploded view in FIG. 9F. In this example, the baffle subassembly 70" has a first housing portion 910 and a second housing portion 912. The first housing portion 910 and the second housing portion 912 have a lens 914 disposed therein. The first housing portion 910 and the second housing portion 912 may also be formed together as a unitary structure having the lens 914 therein. The lens 914 is disposed at an angle relative to the plane 926 of the flange 66 of the trim piece 60' which, in this example, is parallel to the surface (e.g., ceiling or wall) into which the luminaire 10" is mounted. Of course, other non-parallel positions or angles maybe used. That is, the plane of the lens 914 may be not normal to the longitudinal axis 12. The lens 914 may be planar and contain various types of optics. In one example, the lens 914 was frosted to diffuse the light. The second housing portion 912 includes a retainer 916 disposed therein. The retainer 916 comprises a lip or edge that supports the lens 914 therein. A second retainer 918 is disposed at the opposite end of the lens 914 as the retainer 916. When the first housing portion 910 is secured to the second housing 912, the lens 914 maintains the angular position. Fasteners 920 may be used to secure the first housing 910 to the second housing portion. Other fastening means may also be used. For example, heat stakes, snaps and other methods may be used. The retainer 916 and fasteners 920 may be eliminated in favor of adhesives or, heat stakes, or snaps.

The first housing portion 910 has a light receiver 919 to accommodate the light source 32 and lens as will be described in more detail below.

The second housing portion 912 has a first lateral edge 922 and a second lateral edge 924, both of which are flush with the bottom surface of the flange 66. The lateral edges 922 and 924 are connected together with a first surface 930 and a second surface 932. The first surface 930 extends angularly outwardly from the plane of the trim piece 60'. A triangular portion 934 of the second surface 932 is proud of (extends below in this figure) the plane 926 of the trim piece 60'. In one constructed embodiment, surface 930 extends proud of the plane 926. The mounting surface 929 corresponds to the ceiling 908 adjacent to the wall 906. The first surface 930 is only a few millimeters below the plane 926 of the flange 66 or trim piece 60'. Of course, the final extension is determined by the end application. This allows the edge of the lens 914 to be below the edge of the trim piece 60', and more specifically, below the plane 926 of the flange 66. More specifically, one point or partial surface of the lens 914 is disposed below the lower body or the plane defined thereby. This allows light to wash the ceiling 908 adjacent the luminaire 10" and the wall 906 (and the corner 933 thereof) by distributing light within the angle 936.

Side 940 extends at an angle to form the retainer 918 for the lens 914. The side 940 as illustrated is at a non-normal angle to both the lens 914 and the plane of the flange 66 of the trim piece 60'. However, the side 940 may be normal to the lens and the plane of the flange 66.

An upper body 38' is coupled to the lower body 54'. The upper body 38' may include the heat sink subassembly 14, the upper lens holder 712, an extension 950, lens 952, mount 34, and light source 32. The optic subassembly 30 is illustrated best in FIGS. 9D and 9E may have an extension 950 to which the light source 32 is coupled. In this example, a single lens 952 is generally planar and is disposed at the same angle or similar angle with respect to the lens 914. The upper lens holder 712 described above may be used to mount the lens 952 to the extension 950. The lens holder 712 and the light source 32 may be mounted off the longitudinal axis 12 of the luminaire 10". The extension 950 may be eliminated in favor of a shaped upper body heat sink subassembly 14. In this manner, the light from the light source illuminates the wall 906 in a meaningful and even manner, including the portions closest to the plane that the fixture is mounted to 908. The ceiling/mounting plane 908 may be slightly washed with light as well, although this is not the primary intended purpose of this specific end application. In some other instances this may be needed/intentional. This is achieved with a minimal reveal below the plane of the flange 66 of the trim piece 60 as illustrated by the optical angle range 936 illustrated in FIG. 9C.

Figure 9A:
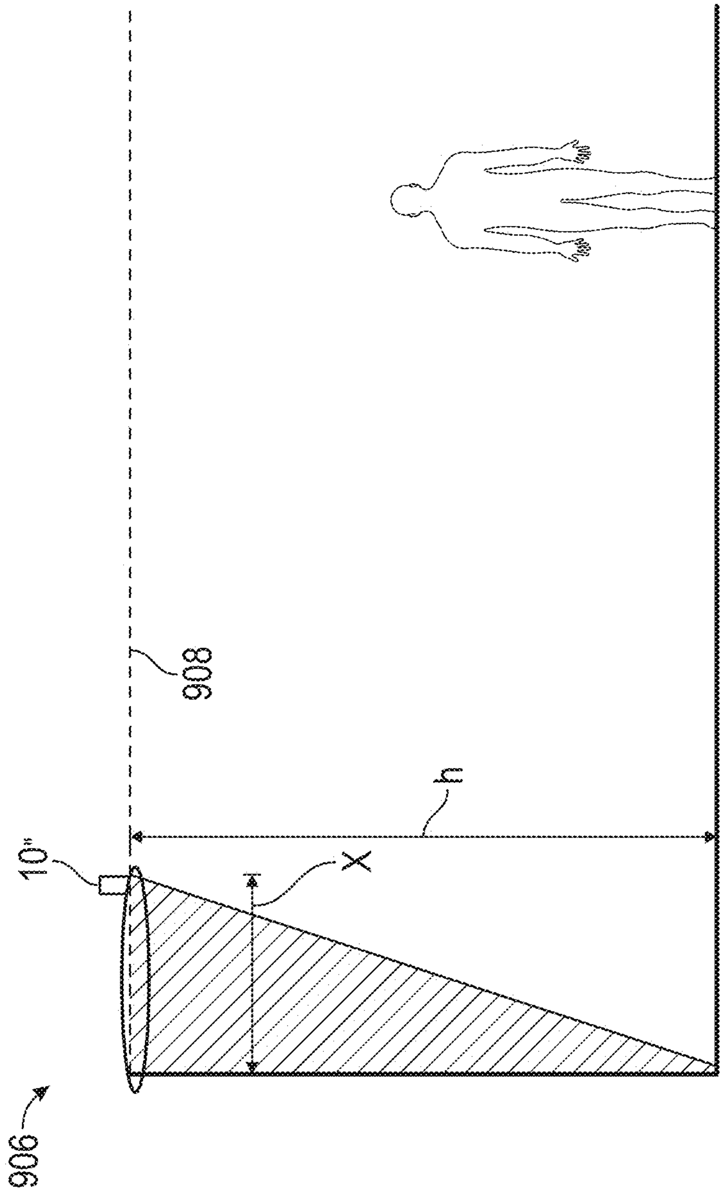
FIG. 9A is a side view of a recessed luminaire used for wall washing.
Figure 9B:
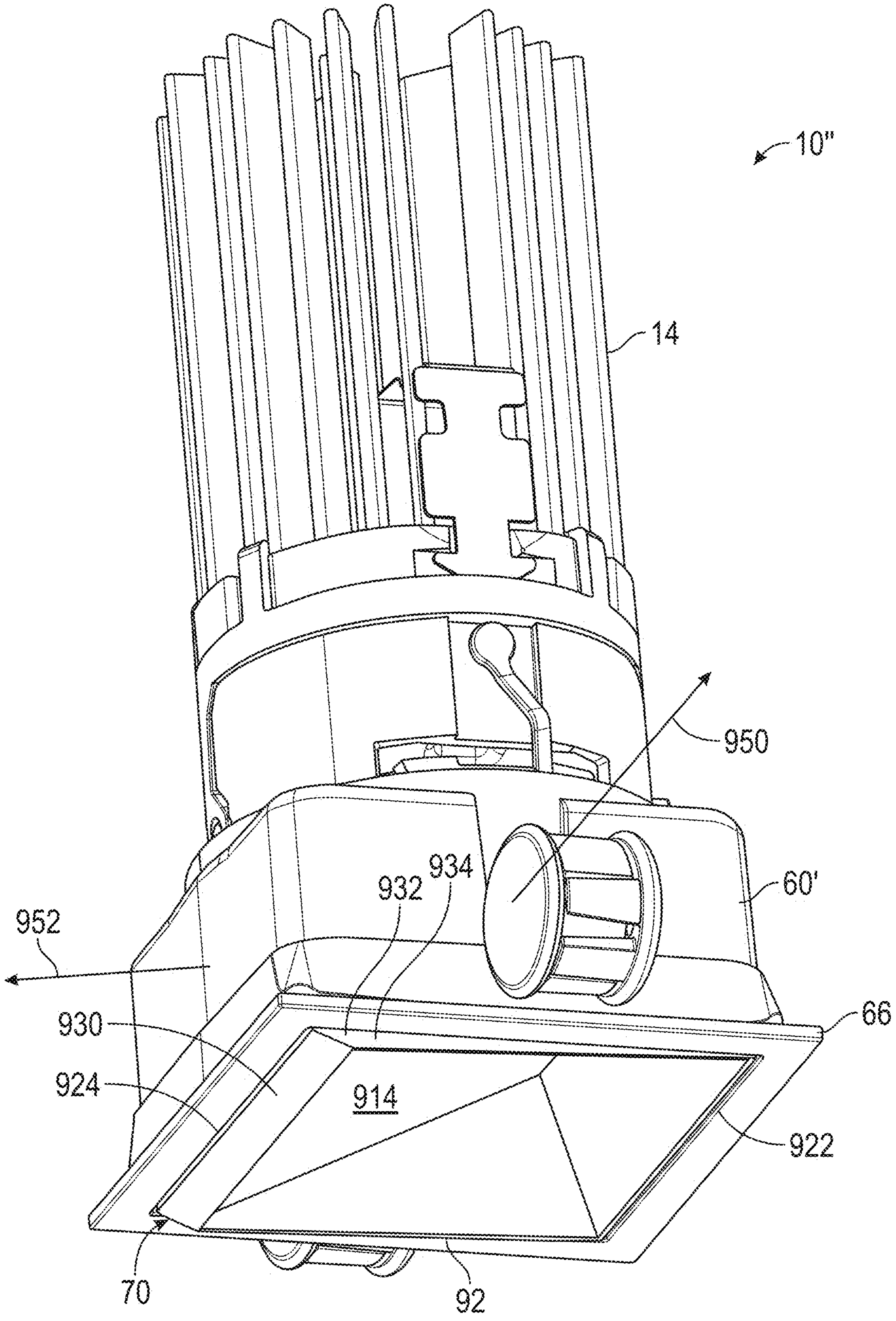
FIG. 9B is a bottom perspective view of the luminaire of FIG. 9A.
Figure 9C:
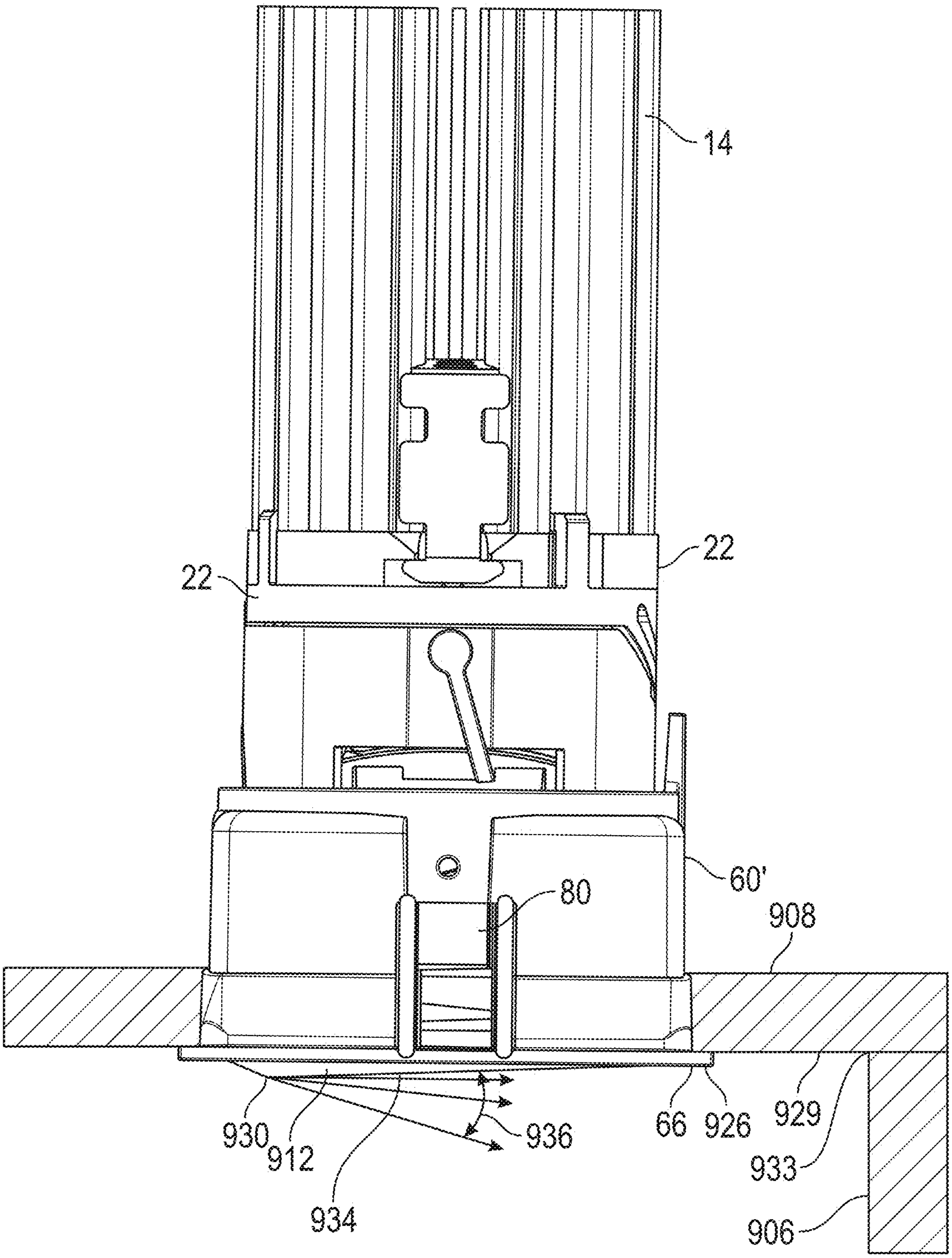
FIG. 9C is a second side view of the recessed luminaire of FIG. 9A.
Figure 9D:
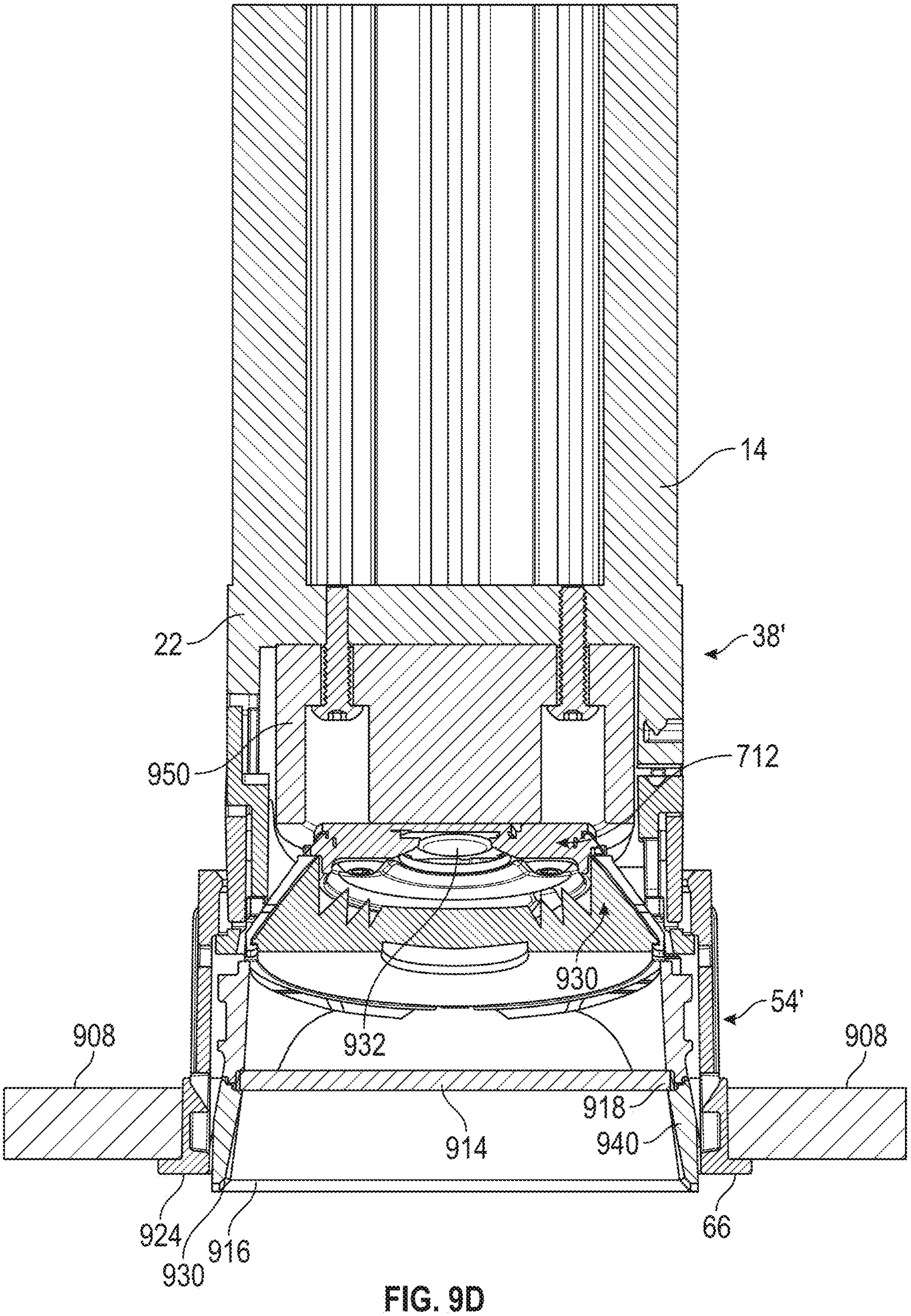
FIG. 9D is a first cross sectional view of the recessed luminaire.
Figure 9E:
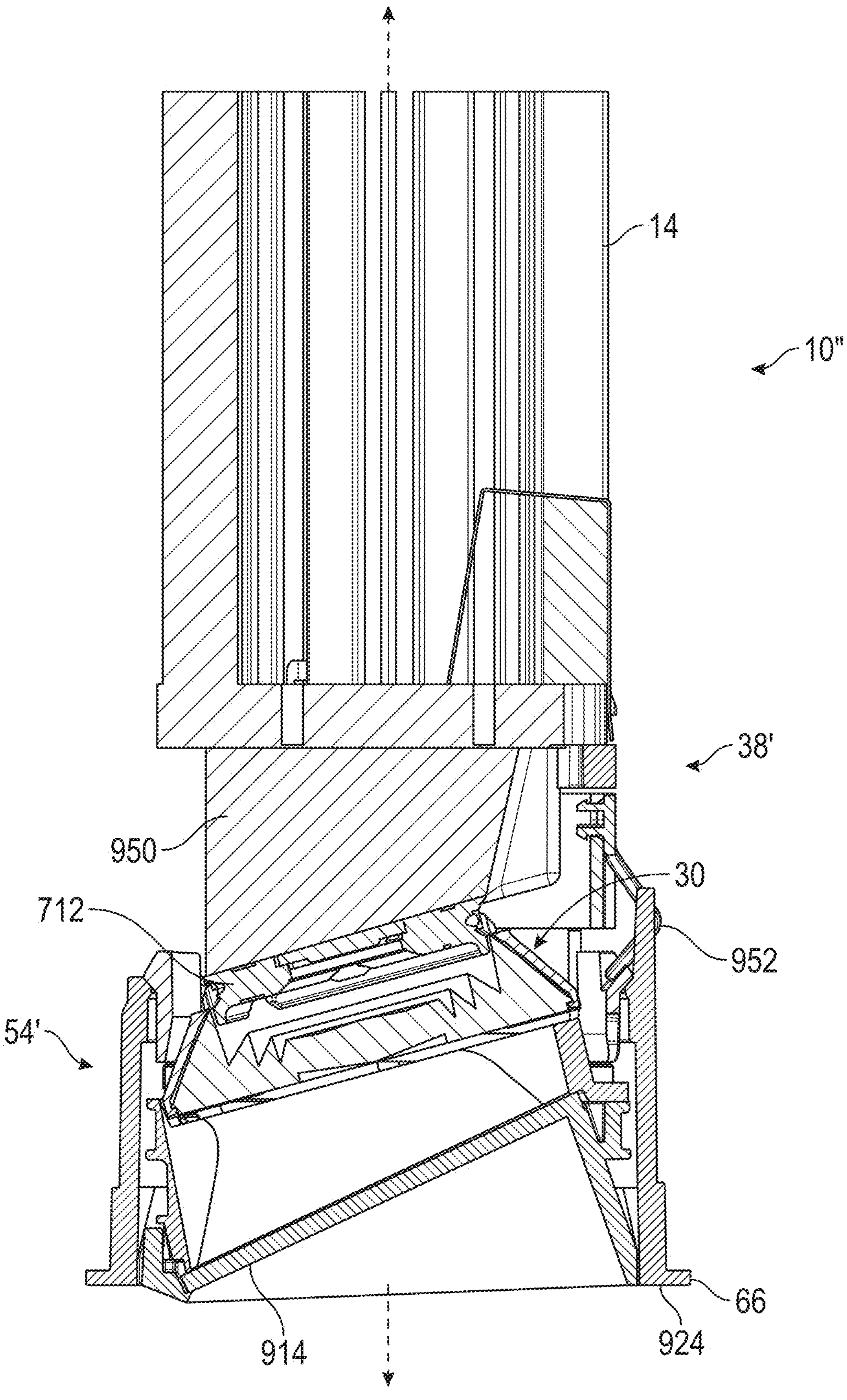
FIG. 9E is a cross sectional view of the recessed luminaire in the opposite direction of FIG. 9E.
Figure 9F:
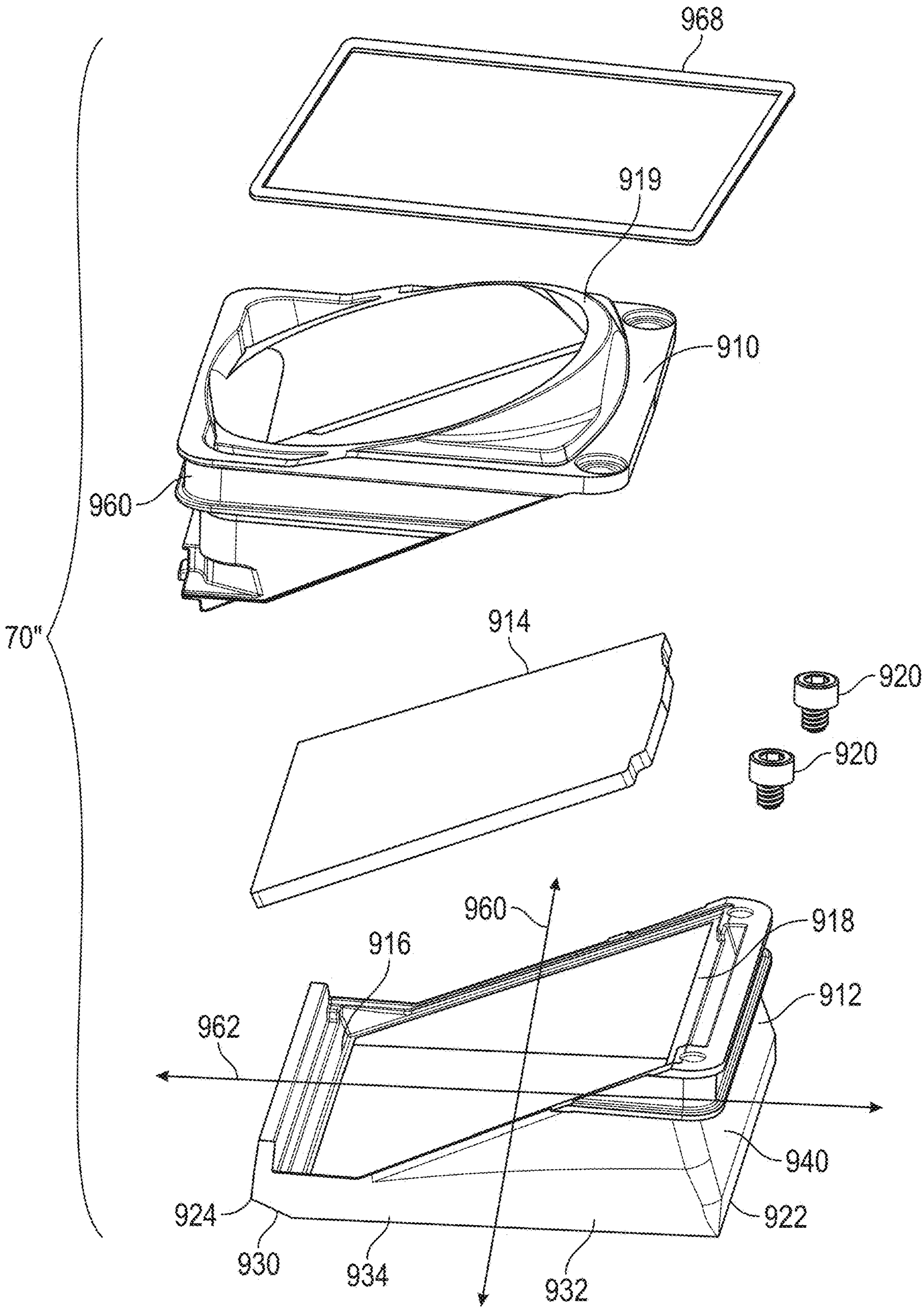
FIG. 9F is a partially exploded view of the baffle of the luminaire of FIG. 9A.

In FIG. 9F, the lens 914 is tilted about a first axis 960 that is parallel to plane 926. The lens holder 712 is tilted about the second axis 962 which is also parallel to the plane 926.

A sealing ring 968 may be disposed around an exterior of the baffle subassembly 70" to seal the baffle subassembly 70" within the trim piece 60'. The sealing ring 968 may be disposed in a sealing channel disposed around the baffle subassembly 70'. The sealing ring 968 may conform to the shape of the baffle subassembly 70'

Features of the luminaire such as the spring retention, the tilting mechanism and the zoomable feature may be used together or separately in a luminaire. Different forms of tilting mechanisms are set forth. When tilting is desired, one of the tilting mechanisms may be used.

Figure 10A:
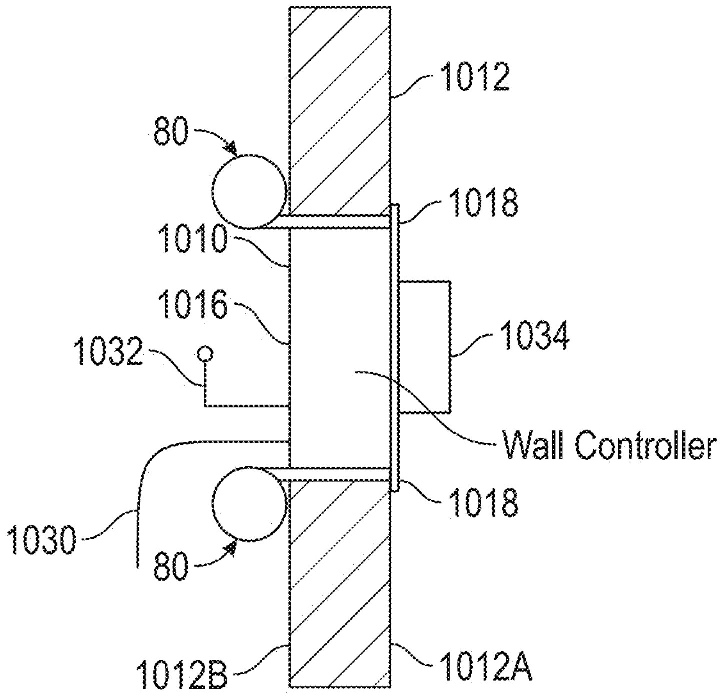
FIG. 10A is a side cross-sectional view of a component within a wall.

Referring now to FIG. 10A, a side cross-sectional view of a component 1010 such as but not limited to a wall controller is set forth within a wall 1012. The component 1010 is coupled to or has body 1016 to which one or more spring retention assemblies 80 are coupled. The body 1016 has flanges 1018 formed therein or coupled thereto. The flanges 1018 are forced against the outer surface 1012A by the action of the spring retention assemblies 80 that provide a force against the inner surface 1012B of the wall 1012. The body 1016 is pulled into the opening of the wall 1012 but is prevented from moving further by the flanges 1018.

As illustrated the component 1010 is an electrical component. The component 1010 may have a power line 1030 coupled thereto for controlling a device or power the component 1010 or both. The component 1010 may also have an antenna 1032 for wirelessly communicating to another device. The component 1010 may be powered by a battery. A user interface 1034 such as a button, switch, dial, touch screen or touch pad may be part of the component.

Figure 10B:
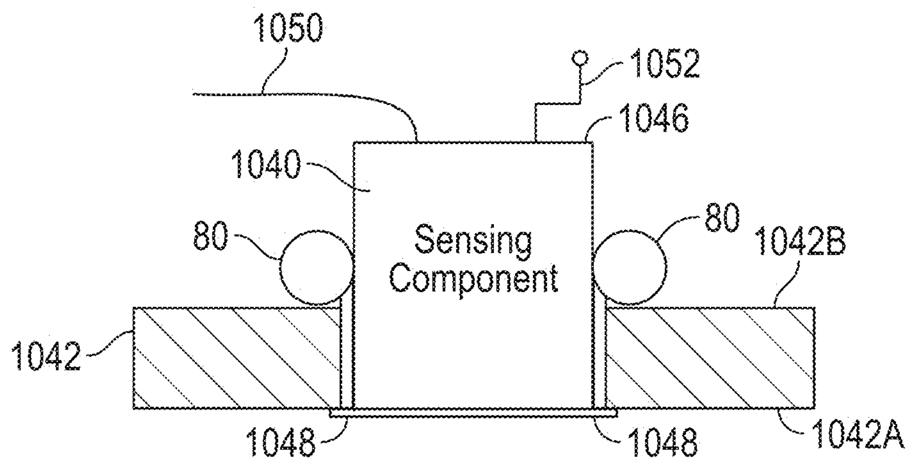
FIG. 10B is a side cross-sectional view of a component within a ceiling.

Referring now to FIG. 10B, a side cross-sectional view of a component 1040 such as but not limited to a sensor is set forth within a ceiling 1042. Of course, the sensor may be located within an opening of the wall 1012 as well. The component 1040 is coupled to or has body 1046 to which one or more spring retention assemblies 80 are coupled. The body 1046 has flanges 1048 formed therein or coupled thereto. The flanges 1048 are forced against the outer surface 1042A by the action of the spring retention assemblies 80 that provide a force against the inner surface 1042B of the ceiling 1042.

As illustrated the component 1040 is a sensing component. The sensing component 1040 may have a power line 1050 coupled thereto for controlling a device or power the component 1040 or both. The component 1040 may also have an antenna 1052 for wirelessly communicating to another device. The component 1040 may be powered by a battery. Examples of a sensing component include but are not limited to a camera, a smoke detector, a vapor detector, a gas detector, a motion detector, a glass breakage detector, an alarm, and a thermal detector.

Figure 10C:
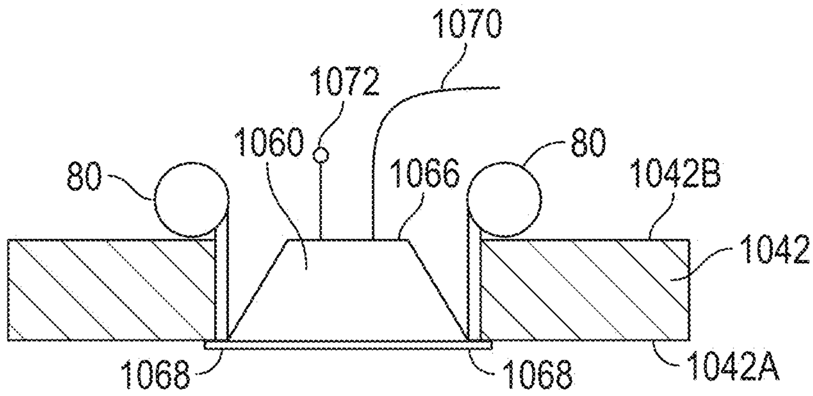
FIG. 10C is a side cross-sectional view of a speaker component within a wall.

Referring now to FIG. 10C, a side cross-sectional view of a speaker 1060 is set forth within a ceiling 1042. The speaker 1060 may also be located within the wall 1012 in a similar manner. The speaker 1060 is coupled to or has body 1066 to which one or more spring retention assemblies 80 are coupled. The body 1066 has flanges 1068 formed therein or coupled thereto. The flanges 1068 are forced against the outer surface 1042A by the action of the spring retention assemblies 80 that provide a force against the inner surface 1042B of the wall 1012. The speaker 1060 may be wired with a wire 1070 or wirelessly connected through an antenna 1072.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Terms such as “lighting,” or light source as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g., “regular light bulbs”) of any suitable type. The illumination light output of an artificial illumination type luminaire, for example, may have an intensity and/or other characteristic(s) that satisfy an industry acceptable performance standard for a general lighting application. Suitable light generation sources include various conventional lamps, such as incandescent, fluorescent or halide lamps; one or more light emitting diodes (LEDs) of various types, such as planar LEDs, micro LEDs, micro organic LEDs, LED on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent diodes (SLD) and micro laser diodes. Of course, these light generation technologies are given by way of non-limiting examples, and other light generation technologies may be used.

The term “coupled” as used herein refers to any logical, optical, physical or electrical connection, link or the like by which signals, or light produced or supplied by one system element are imparted to another coupled element. Unless described otherwise, coupled elements or devices are not necessarily directly connected to one another and may be separated by intermediate components, elements or communication media that may modify, manipulate or carry the light or signals. The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "downward," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A light assembly comprising:

a light source;

a first lens;

a first lens holder coupled around the light source holding the first lens in a fixed position relative to the light source, the first lens holder comprising a recess on an outer surface;

a second lens;

a second lens holder rotatably coupled to the first lens holder and holding the second lens optically adjacent to the first lens, the second lens holder comprises a finger having a tab, said tab adjacent to a surface of a base of a heat sink subassembly, said finger disposed within the recess, said second lens holder and the second lens rotatable relative to the first lens and the first lens holder;

a heat sink assembly;

a mount coupled to the heat sink subassembly comprising a retainer slot; and a retainer extending longitudinally from the first lens holder, the retainer received by the retainer slot.

2. The light assembly of claim 1 wherein the first lens holder comprises an outer cylindrical wall, wherein the recess comprises a first slot, wherein the first slot and tab define a maximum beam spread and a minimum beam spread of the first lens and the second lens.

3. The light assembly of claim 2 where in the outer cylindrical wall further comprises a second slot, said second slot receiving a second tab disposed on a second finger extending longitudinally from the second lens holder.

4. The light assembly of claim 1 wherein the first lens holder is cylindrical comprising a first diameter and the second lens holder comprising a second diameter greater than the first diameter.

5. The light assembly of claim 1 wherein the first lens holder fits partially within the second lens holder.

6. The light assembly of claim 1 wherein in the first lens holder comprises a plurality of detents on an outer wall thereof, said detents engaging a detent finger extending longitudinally therefrom, said detent finger engaging one of the detents.

7. The light assembly of claim 6 wherein the second lens comprises an extension extending radially therefrom, said second lens holder comprises a notch on an inner surface of the outer wall, said extension received within the notch.

8. The light assembly of claim 1 wherein the second lens holder comprises an accessory holder.

9. The light assembly of claim 8 wherein the accessory holder comprises an accessory comprising at least one of a diffuser, a filter, an optical element, a colorizer, and a beam shaper.

10. A light assembly comprising:

a heat sink subassembly;

a light source coupled to the heat sink subassembly;

a first lens;

a first lens holder coupled around the light source holding the first lens in a fixed position relative to the light source;

a second lens; and a second lens holder rotatably coupled to the first lens holder and holding the second lens optically adjacent to the first lens, said second lens holder and the second lens rotatable relative to the first lens and the first lens holder, the first lens holder comprises a plurality of recesses on an outer surface and wherein the second lens holder comprises fingers having a tab, said tab adjacent to a surface of a base of the heat sink subassembly, said fingers disposed within respective recesses; and a mount coupled to a heat sink subassembly and a retainer extending longitudinally from the first lens holder, said mount comprising a retainer slot receiving the retainer.

11. The light assembly of claim 10 wherein the first lens holder comprises an outer cylindrical wall having a slot therethrough and the second lens holder comprises a finger comprising the tab, the tab received within the slot, wherein the slot and the tab define a maximum beam spread and a minimum beam spread of the first lens and the second lens.

12. The light assembly of claim 11 where in the outer cylindrical wall further comprises a second slot, said second slot receiving a second tab disposed on a second finger extending longitudinally from the second lens holder.

13. The light assembly of claim 10 wherein the first lens holder is cylindrical comprising a first diameter and the second lens holder comprising a second diameter greater than the first diameter.

14. The light assembly of claim 10 wherein the first lens holder fits partially within the second lens holder.

15. The light assembly of claim 10 wherein in the first lens holder comprises a plurality of detents on an outer wall thereof, said detents engaging a detent finger extending longitudinally therefrom, said detent finger engaging one of the detents.

16. The light assembly of claim 15 wherein the second lens comprises an extension extending radially therefrom, said second lens holder comprises a notch on an inner surface of the outer wall, said extension received within the notch.

17. The light assembly of claim 10 wherein the second lens holder comprises an accessory holder.

18. The light assembly of claim 17 wherein the accessory holder comprises an accessory comprising at least one of a diffuser, a filter, an optical element, a colorizer, and a beam shaper.

* * * * *